(12) United States Patent
Hane et al.

(10) Patent No.: US 12,353,972 B2
(45) Date of Patent: Jul. 8, 2025

(54) MACHINE LEARNING TECHNIQUES USING ITERATIVE FEATURE REFINEMENT ROUTINES

(71) Applicant: UnitedHealth Group Incorporated, Minnetonka, MN (US)

(72) Inventors: Christopher A. Hane, Irvine, CA (US); Vijay S. Nori, Roswell, GA (US)

(73) Assignee: UnitedHealth Group Incorporated, Minnetonka, MN (US)

(*) Notice: Subject to any disclaimer, the term of this patent is extended or adjusted under 35 U.S.C. 154(b) by 803 days.

(21) Appl. No.: 17/449,995

(22) Filed: Oct. 5, 2021

(65) Prior Publication Data
US 2023/0106667 A1    Apr. 6, 2023

(51) Int. Cl.
*G06N 20/20* (2019.01)
*G06F 18/211* (2023.01)
*G06F 18/2115* (2023.01)
*G06F 18/245* (2023.01)
*G06F 18/27* (2023.01)

(52) U.S. Cl.
CPC .......... *G06N 20/20* (2019.01); *G06F 18/211* (2023.01); *G06F 18/245* (2023.01); *G06F 18/2115* (2023.01); *G06F 18/27* (2023.01)

(58) Field of Classification Search
CPC ..... G06N 20/20; G06F 18/211; G06F 18/245; G06F 18/27; G06F 18/2115
See application file for complete search history.

(56) References Cited

U.S. PATENT DOCUMENTS

| | | | |
|---|---|---|---|
| 9,886,670 B2 | 2/2018 | Dirac et al. | |
| 10,541,807 B1 | 1/2020 | Morimura et al. | |
| 10,978,179 B2 | 4/2021 | Beltre et al. | |
| 2018/0060744 A1* | 3/2018 | Achin | G06N 20/00 |
| 2019/0156923 A1 | 5/2019 | Kain et al. | |
| 2019/0279775 A1 | 9/2019 | Dey et al. | |
| 2020/0279629 A1 | 9/2020 | Morrissey et al. | |
| 2020/0365239 A1 | 11/2020 | Sabharwal et al. | |
| 2020/0411199 A1 | 12/2020 | Shrager et al. | |
| 2022/0147865 A1* | 5/2022 | Naidoo | G06N 3/09 |

OTHER PUBLICATIONS

Apte et al., (NPL "Data-intensive analytics for predictive modeling" Published Jan. 2003 (pp. 17-23) (Year: 2003).*
Zhao et al., (NPL "Data-intensive analytics for predictive modeling" Published May, 2001 (pp. 17-23), (Year: 2021).*

(Continued)

*Primary Examiner* — Quoc A Tran
(74) *Attorney, Agent, or Firm* — ALSTON & BIRD LLP

(57) ABSTRACT

Various embodiments of the present invention provide methods, apparatus, systems, computing devices, computing entities, and/or the like for performing predictive data analysis with respect to categorical data objects. Certain embodiments of the present invention utilize systems, methods, and computer program products that perform predictive data analysis with respect to categorical data objects by utilizing at least one of predictive feature hierarchies, feature refinement routines, decision subsets of predictive features that are generated based at least in part on predictiveness measures for the predictive features, and/or the like.

20 Claims, 10 Drawing Sheets

(56) References Cited

OTHER PUBLICATIONS

"FDA-AACR Real-World Evidence Workshop," FDA U.S. Food & Drug Administration, Jul. 19, 2019, (363 pages), Bethesda, Maryland.

Anastopoulos, Ioannis N. et al. "Multi-Drug Featurization and Deep Learning Improve Patient-Specific Predictions of Adverse Events," International Journal of Environmental Research and Public Health, vol. 18, Issue 5:2600, Mar. 5, 2021, pp. 1-11, DOI: 10.3390/ijerph18052600.

Booth, Christopher M. "Real-World Data: Towards Achieving the Achievable in Cancer Care," Nature Reviews|Clinical Oncology. vol. 16, No. 5, May 2019, pp. 312-325.

Chen, Tianqi et al. "XGBoost: A Scalable Tree Boosting System," KDD '16: Proceedings of the 22nd ACM SIGKDD International Conference on Knowledge Discovery and Data Mining, Aug. 13, 2016, pp. 785-794, DOI: 10.1145/2939672.2939785.

\* cited by examiner

MACHINE LEARNING TECHNIQUES USING ITERATIVE FEATURE REFINEMENT ROUTINES

BACKGROUND

Various embodiments of the present invention address technical challenges related to performing predictive data analysis with respect to categorical data objects. Various embodiments of the present invention address the shortcomings of existing categorical machine learning systems and disclose various techniques for efficiently and reliably performing predictive data analysis with respect to categorical data objects in various structured database systems.

BRIEF SUMMARY

In general, embodiments of the present invention provide methods, apparatus, systems, computing devices, computing entities, and/or the like for performing predictive data analysis with respect to categorical data objects. Certain embodiments of the present invention utilize systems, methods, and computer program products that perform predictive data analysis with respect to categorical data objects by utilizing at least one of predictive feature hierarchies, feature refinement routines, decision subsets of predictive features that are generated based at least in part on predictiveness measures for the predictive features, and/or the like.

In accordance with one aspect, a method is provided. In one embodiment, the method comprises: for each predictive feature value of a plurality of predictive feature values of a predictive input, identifying a predictiveness measure; determining a decision subset of the plurality of predictive feature values based at least in part on each predictiveness measure, wherein: (i) the decision subset is initialized to comprise all of the plurality of predictive feature values, (ii) determining the decision subset comprises performing one or more feature refinement routine iterations until a target feature refinement routine iteration in which a feature coverage count of the decision subset satisfies a feature coverage count threshold, and (iii) performing a current feature refinement routine iteration comprises, in response to determining that the feature coverage count of the decision subset fails to satisfy the feature coverage count threshold and no defined stopping conditions have been satisfied: (a) modifying the decision subset to exclude the predictive feature value in the decision subset that has a lowest predictive measure relative to predictiveness measures that are associated with the decision subset, and (b) performing a subsequent feature refinement routine iteration; determining a predictive output based at least in part on one or more detected predictive trends for the decision subset; and performing one or more prediction-based actions based at least in part on the predictive output.

In accordance with another aspect, a computer program product is provided. The computer program product may comprise at least one computer-readable storage medium having computer-readable program code portions stored therein, the computer-readable program code portions comprising executable portions configured to: for each predictive feature value of a plurality of predictive feature values of a predictive input, identify a predictiveness measure; determine a decision subset of the plurality of predictive feature values based at least in part on each predictiveness measure, wherein: (i) the decision subset is initialized to comprise all of the plurality of predictive feature values, (ii) determining the decision subset comprises performing one or more feature refinement routine iterations until a target feature refinement routine iteration in which a feature coverage count of the decision subset satisfies a feature coverage count threshold, and (iii) performing a current feature refinement routine iteration comprises, in response to determining that the feature coverage count of the decision subset fails to satisfy the feature coverage count threshold and no defined stopping conditions have been satisfied: (a) modifying the decision subset to exclude the predictive feature value in the decision subset that has a lowest predictive measure relative to predictiveness measures that are associated with the decision subset, and (b) performing a subsequent feature refinement routine iteration; determine a predictive output based at least in part on one or more detected predictive trends for the decision subset; and perform one or more prediction-based actions based at least in part on the predictive output.

In accordance with yet another aspect, an apparatus comprising at least one processor and at least one memory including computer program code is provided. In one embodiment, the at least one memory and the computer program code may be configured to, with the processor, cause the apparatus to: for each predictive feature value of a plurality of predictive feature values of a predictive input, identify a predictiveness measure; determine a decision subset of the plurality of predictive feature values based at least in part on each predictiveness measure, wherein: (i) the decision subset is initialized to comprise all of the plurality of predictive feature values, (ii) determining the decision subset comprises performing one or more feature refinement routine iterations until a target feature refinement routine iteration in which a feature coverage count of the decision subset satisfies a feature coverage count threshold, and (iii) performing a current feature refinement routine iteration, in response to determining that the feature coverage count of the decision subset fails to satisfy the feature coverage count threshold and no defined stopping conditions have been satisfied: (a) modifying the decision subset to exclude the predictive feature value in the decision subset that has a lowest predictive measure relative to predictiveness measures that are associated with the decision subset, and (b) performing a subsequent feature refinement routine iteration; determine a predictive output based at least in part on one or more detected predictive trends for the decision subset; and perform one or more prediction-based actions based at least in part on the predictive output.

BRIEF DESCRIPTION OF THE DRAWINGS

Figure 1:
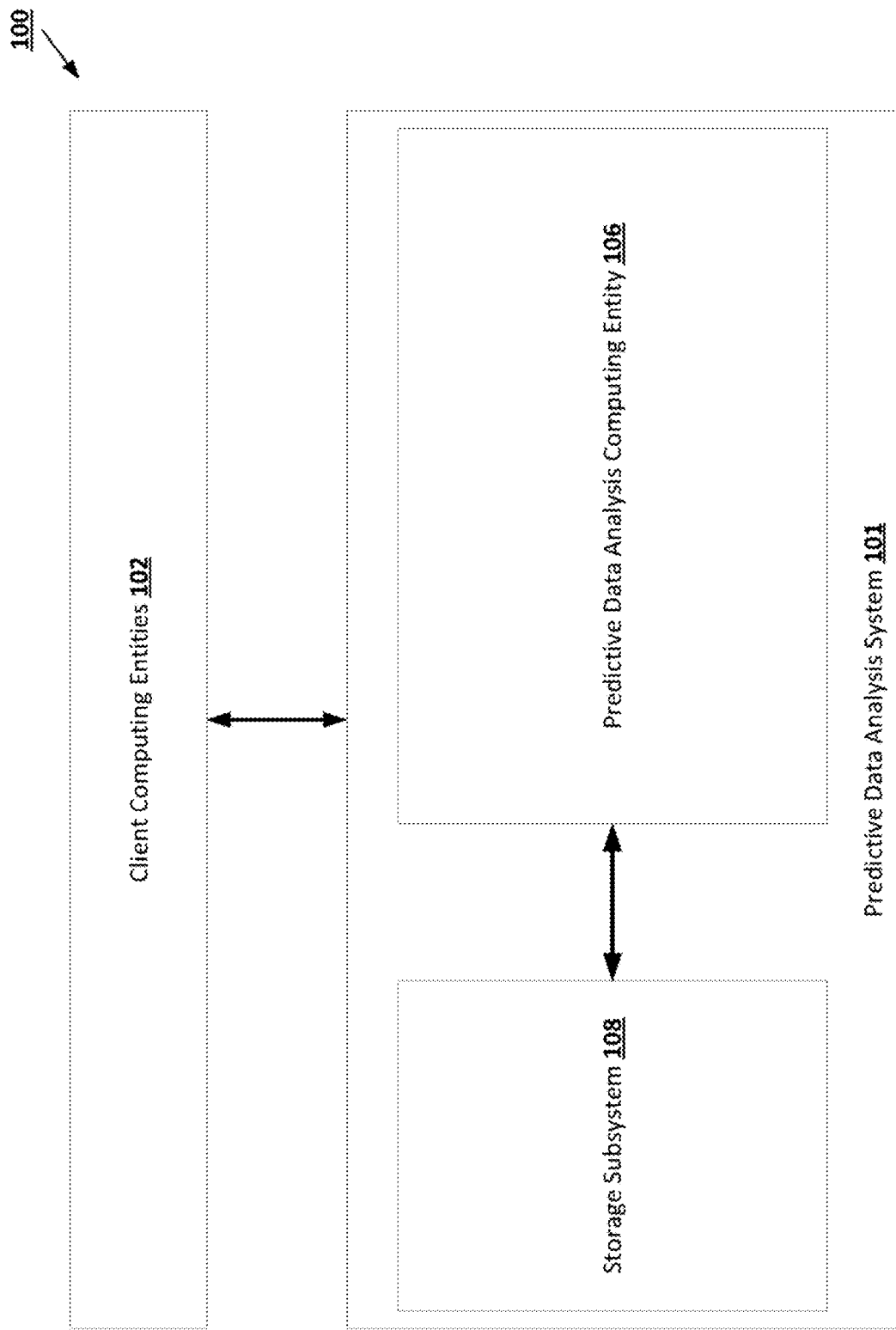

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
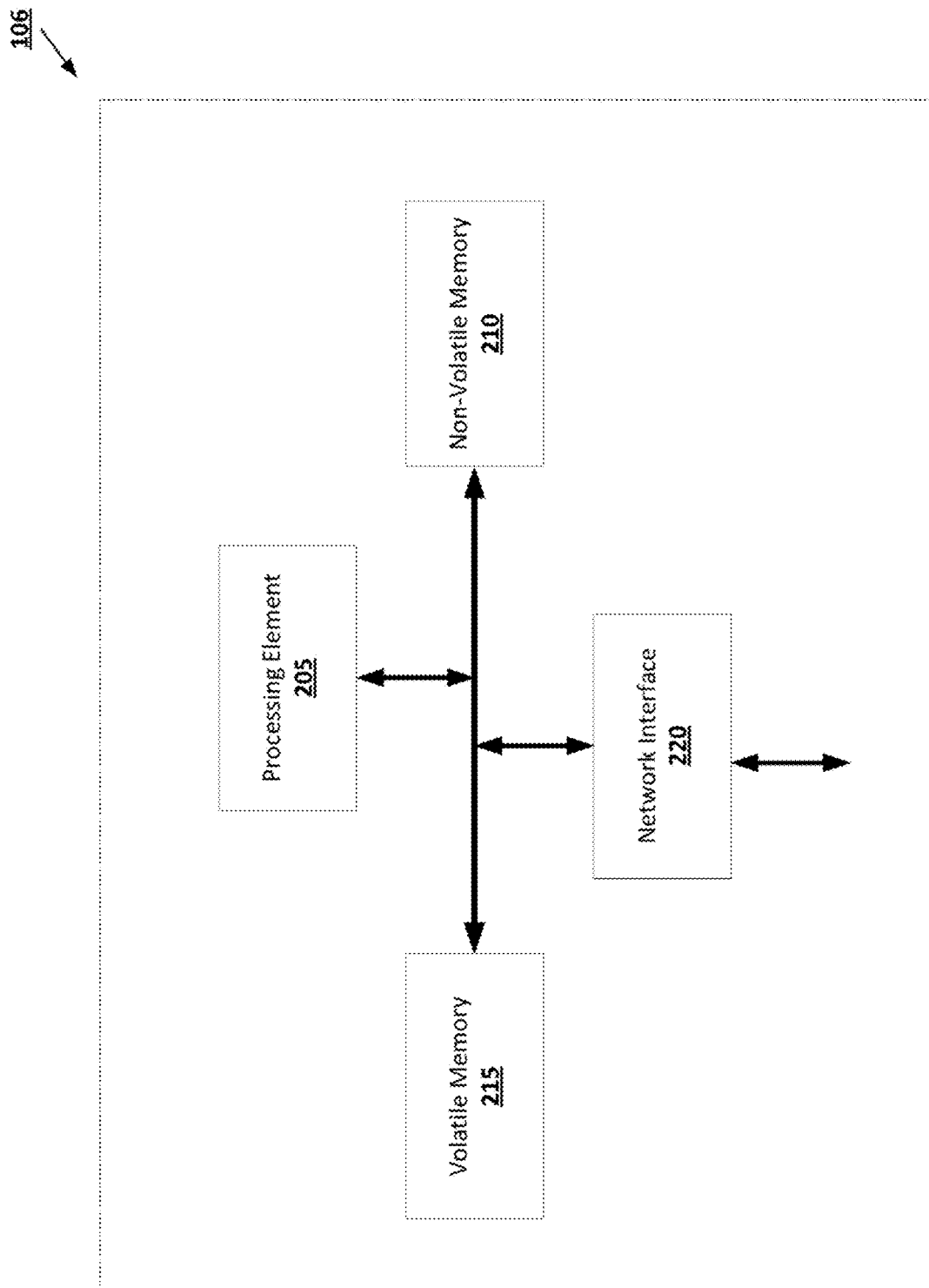

FIG. 2 provides an example predictive data analysis computing entity in accordance with some embodiments discussed herein.

Figure 3:
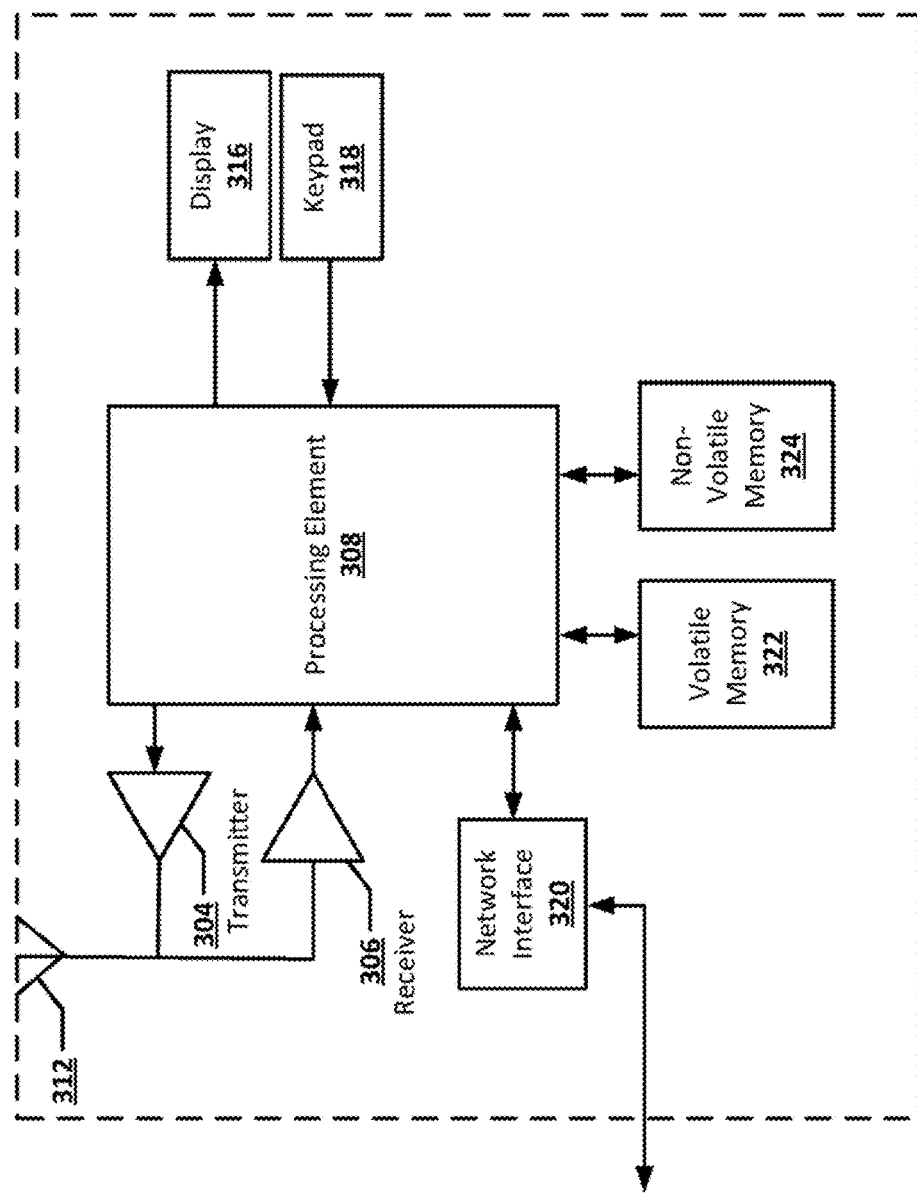

FIG. 3 provides an example external computing entity in accordance with some embodiments discussed herein.

Figure 4:
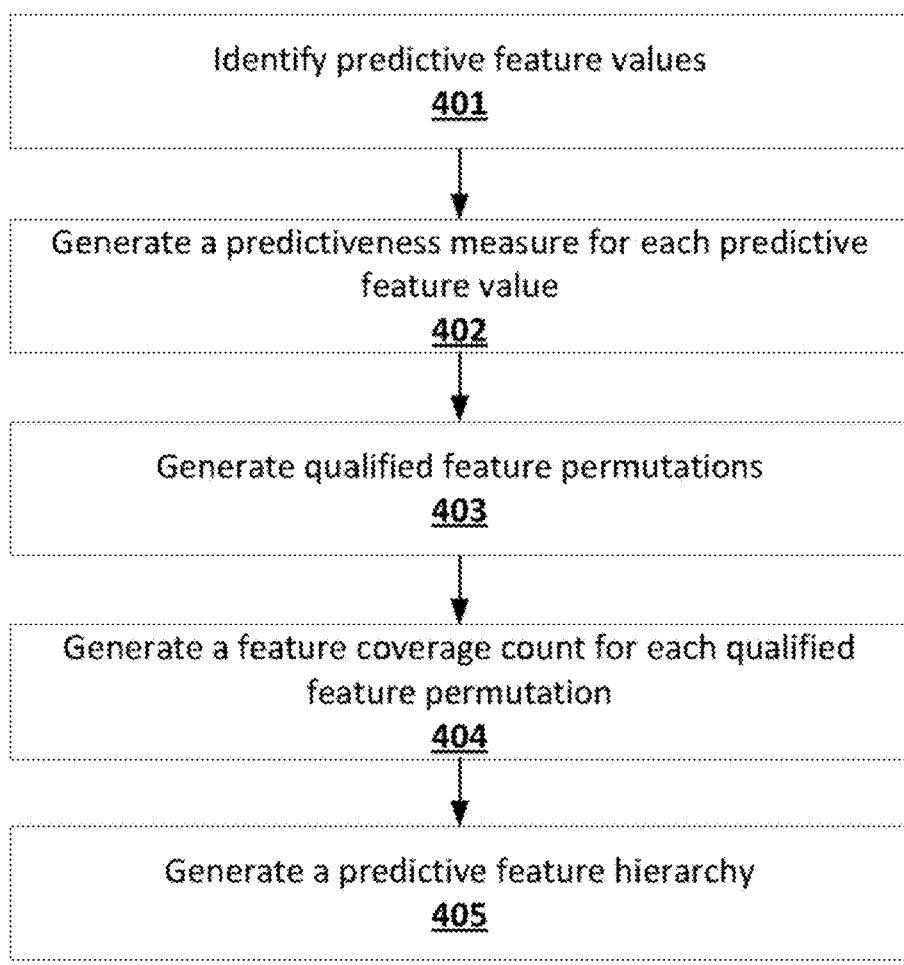

FIG. 4 is a flowchart diagram of an example process for generating a predicted feature hierarchy in accordance with some embodiments discussed herein.

Figure 5:
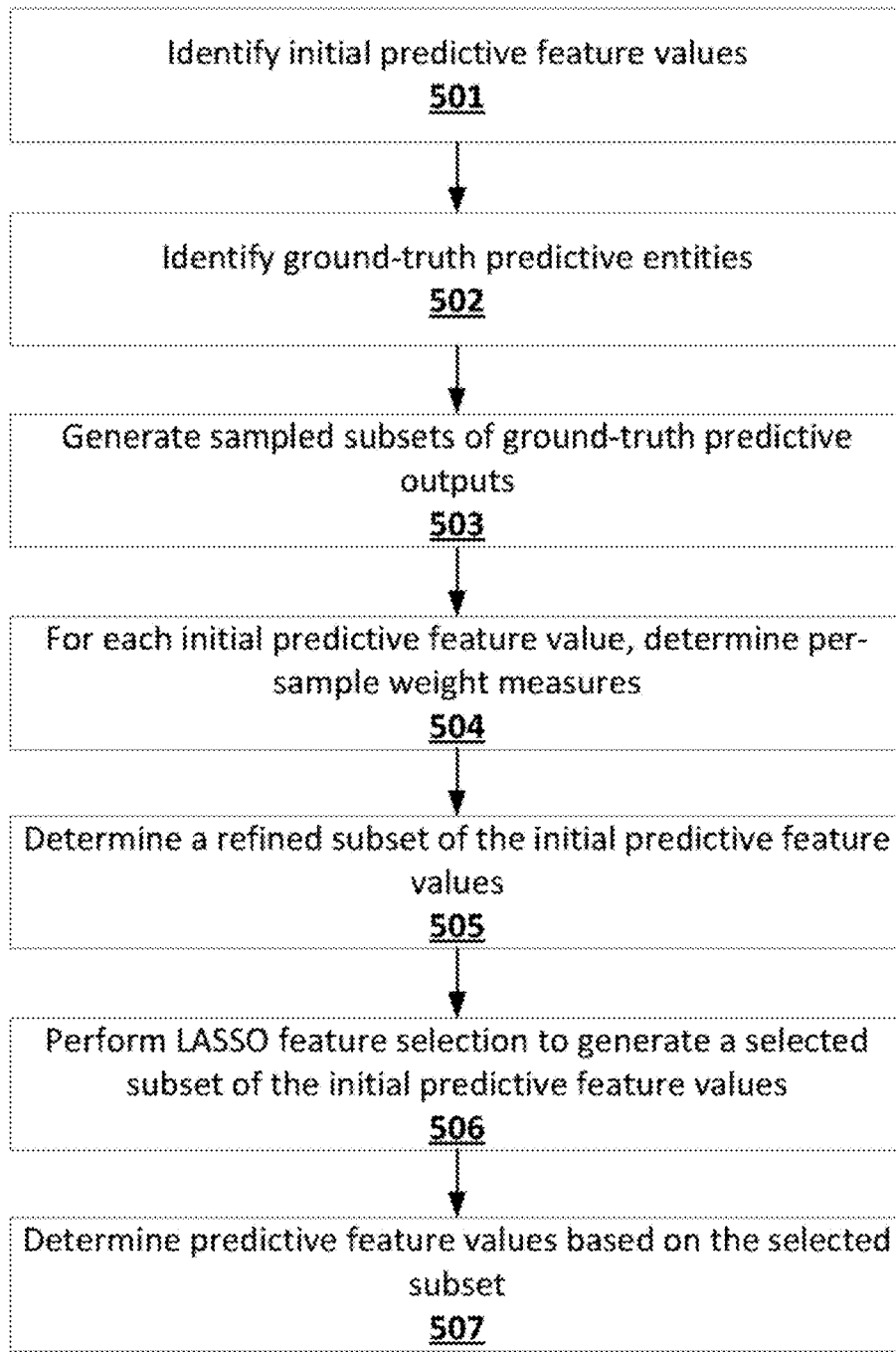

FIG. 5 is a flowchart diagram of an example process for determining predictive feature values for a predictive input in accordance with some embodiments discussed herein.

Figure 6:
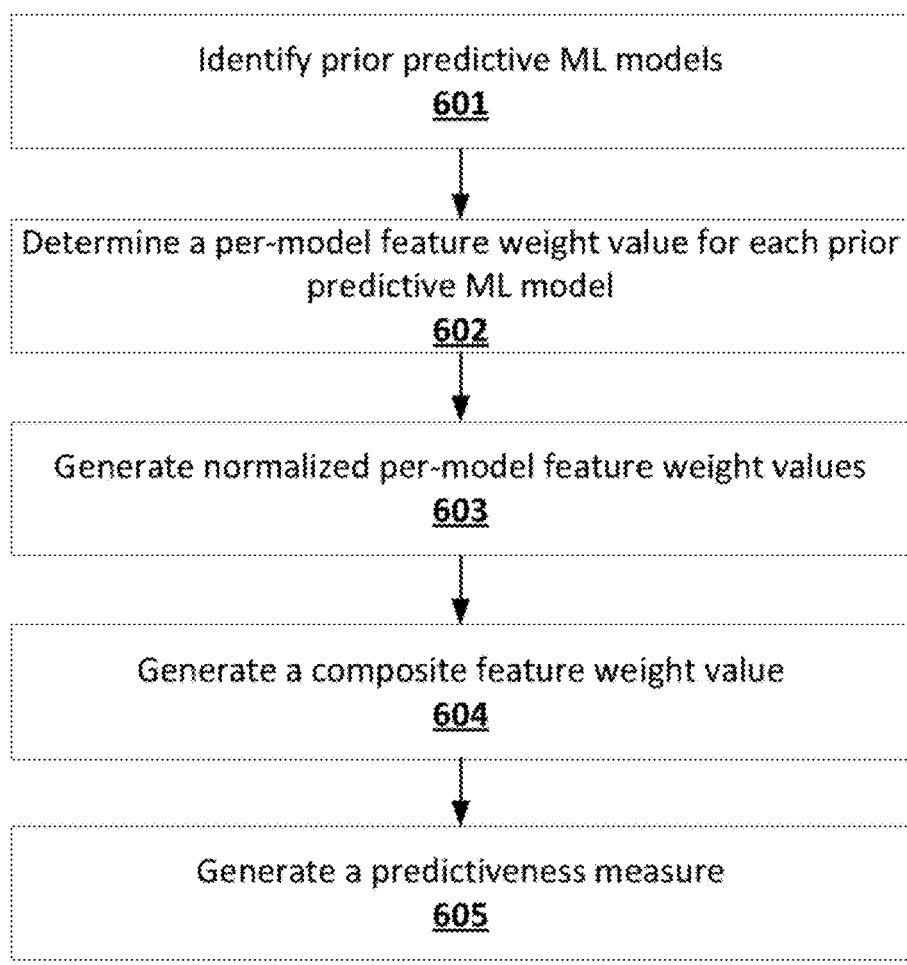

FIG. 6 is a flowchart diagram of an example process for determining a predictiveness measure for a predictive feature in accordance with some embodiments discussed herein.

Figure 7:
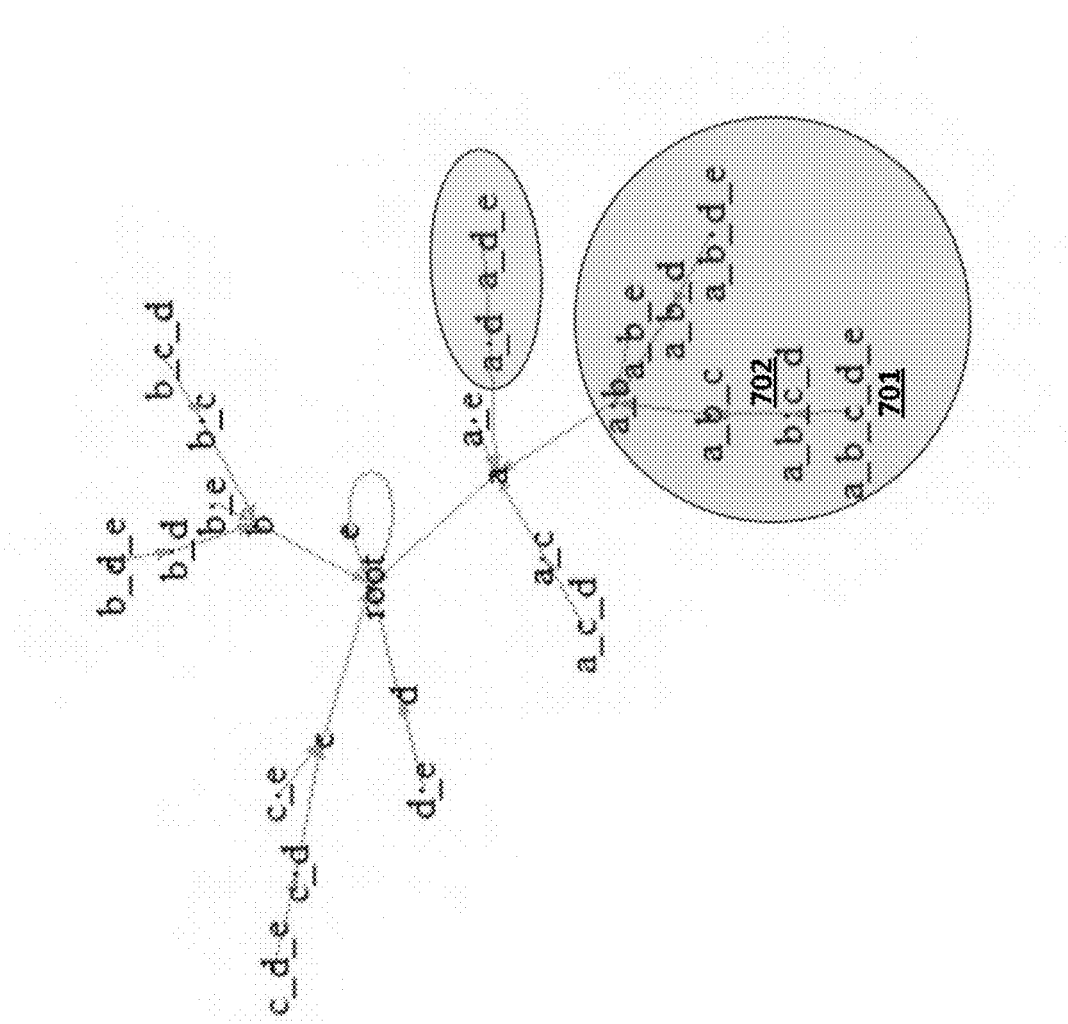

FIG. 7 provides an operational example of a predictive feature hierarchy in accordance with some embodiments discussed herein.

Figure 8:
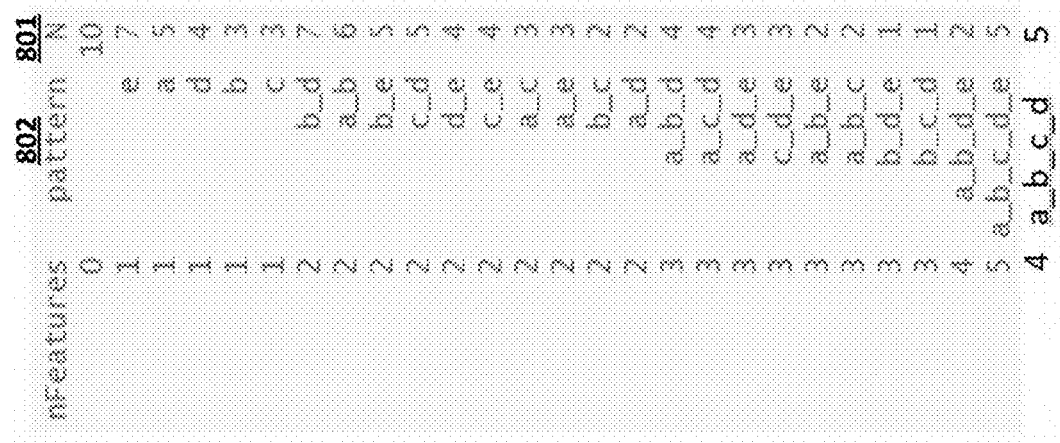

FIG. 8 provides an operational example of a data structure that displays raw feature coverage counts for a set of qualified feature permutations in accordance with some embodiments discussed herein.

Figure 9:
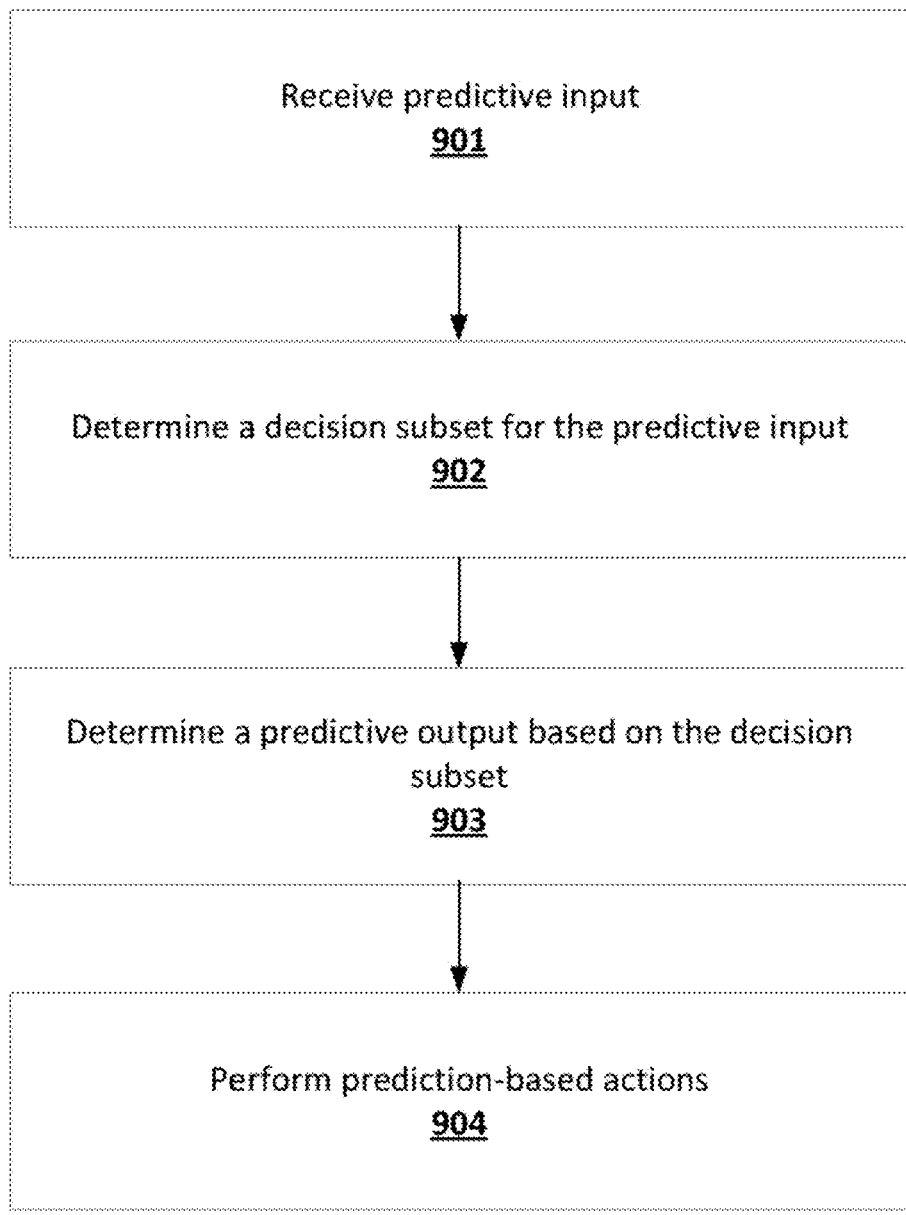

FIG. 9 is a flowchart diagram of an example process for generating a predictive output for a predictive input based at least in part on a decision subset for the predictive input in accordance with some embodiments discussed herein.

Figure 10:
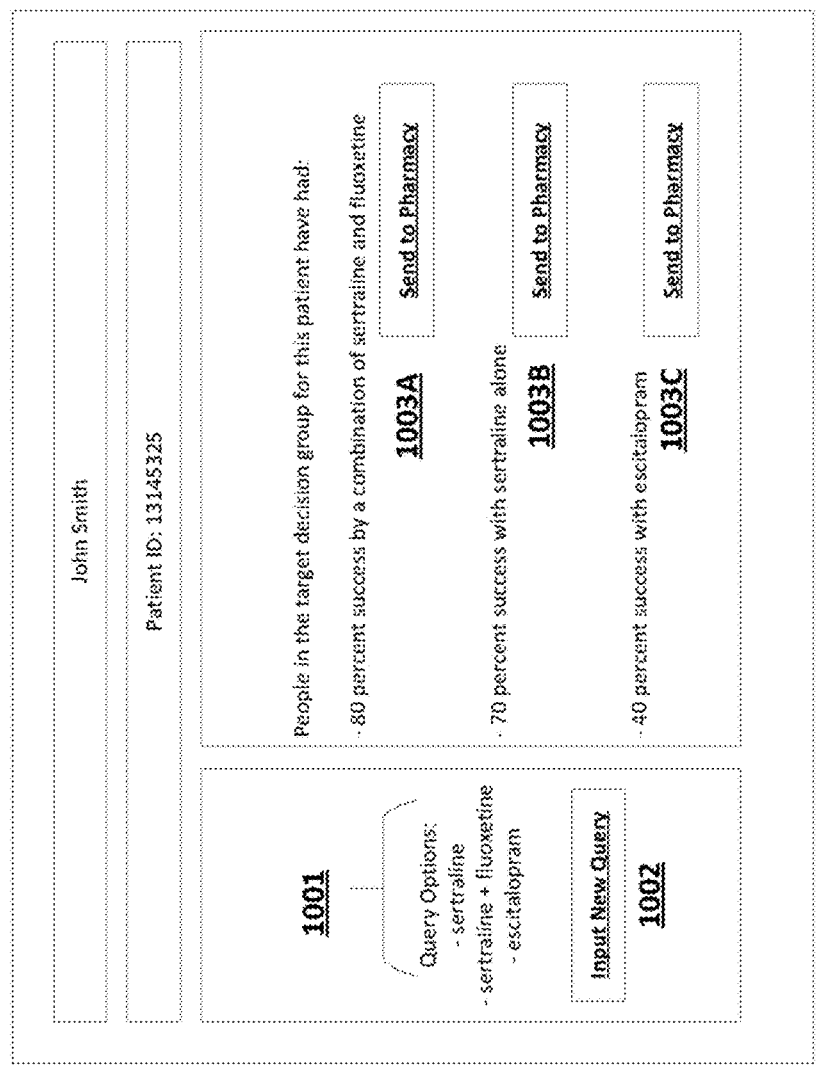

FIG. 10 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention address technical challenges associated with performing predictive data analysis (e.g., machine learning) operations in feature spaces having a high number of categorical predictive features by introducing techniques for intelligently selecting decision subsets of categorical predictive features using iterative feature refinement operations. The noted techniques enable limiting traversals of a training set characterized by a high number of categorical predictive features to a maximal set of categorical predictive features that are associated with at least a threshold number of training entries. This in turn means that, instead of having to traverse all of the training entries to perform predictive data analysis operations, a proposed solution may simply select a subset of the training entries that satisfy the maximal set (and are thus selected in a manner that is configured to minimize the number of the selected training entries). As a result, predictive data analysis operations can be performed more efficiently by focusing on an intelligently-selected subset of the training data, not the entirety of the training data. In this way, various embodiments of the present invention make substantial improvements to the efficiency of predictive data analysis (e.g., machine learning) operations in feature spaces that have a high number of categorical predictive features.

An exemplary application of various embodiments of the present invention relates to generating clinical recommendations based at least in part on real-world evidence (RWE). RWE, as used here, may refer to data that have been collected without respect to an experimental design. Because the noted data have not been collected according to protocols that randomize, control, or blind the data collection, recommendations based at least in part on predictive relationships among the data may prove misleading due to confounding factors or other non-causative correlations.

Intent-to-Treat (ITT) models have been designed to reduce the effect of confounding factors in RWE. ITT models use a propensity score framework to compare individuals that are as similar as possible (based at least in part on known features) except for receiving a treatment of interest. As used here, a "treatment" includes any action, intervention, compound, or policy that may be applied or prescribed to an individual. ITT analysis is relative to an individual and determines a predicted likelihood that an individual receives each treatment. However, knowing that likelihood does not answer whether the treatment will be effective for the individual, which is the question of interest. Outcomes models may determine, for individuals who have received a given treatment, the proportion for whom treatment was effective or, in other cases, a likelihood of effective results if treatment were to start. Effectiveness could be a binary determination or could be measured along a continuum. However, as explained above, outcome models are vulnerable to inaccuracy due to confounding factors and other non-causative correlations. Accordingly, various embodiments invention combine outcome and ITT models to generate treatment recommendations whose influence by confounding factors has been minimized. In some embodiments, an ITT model is trained on two or more sets of patients where the sets are determined based on medical treatments using a set of training data available before the treatment decision is made. In some embodiments, an objective of such an ITT model is to determine a patient's likelihood of receiving the treatments. This may be a propensity score to receive the treatment.

Existing methods of combining results of outcome and ITT models include placing multiple treatments on an X-Y scatterplot in which one axis is a probability of receiving the same treatment (generated by an ITT model) and the other axis is a likelihood of effectiveness (generated by an outcome model). Weighting of the two models relative to each other may include, for example, comparing the area described by each of the treatments relative to the origin of the scatterplot. When generating a treatment recommendation for an individual, considering only others who match the individual for all known features may yield a poor recommendation due to the small sample size (and resulting susceptibility to random effects). A recommendation based at least in part on a larger sample may be made by including members in the sample who are similar but not identical to the individual in question. However, when adding other people to the group used to make the recommendation (i.e., a "decision group" of patients that is determined in accordance with a decision subset of predictive features of patients), in what order should individuals they be added? Which of the known features should be allowed to differ first?

Various embodiments of the present invention rely on the insight that the features allowed to differ first should be those that are least predictive of the outcome of interest. Disregarding the least predictive features first leaves the most predictive features remaining as requirements for inclusion in the decision group. The individuals with the next-most-predictive matching features are added to the decision group until the decision group exceeds a user-determined minimum size. Note that predictiveness, as used here, may be some function of the outputs of the outcomes and ITT models. Accordingly, various embodiments of the present invention rely on generating a decision group for an individual based at least in part on incrementally removing features from a set of features for the individual, where the incremental removal is performed by removing a least predictive feature from the set of features during each removal iteration.

How does one accomplish the sequential adding of individuals to the decision group in a computationally efficient manner? Various embodiments of the present invention recognize that a major source of computational inefficiency comes from features not being listed in a consistent order. For example, if there are only two features A and B, a first individual coded AB would have the same characteristics as a second individual coded BA. The program would need to recognize that the first and second individuals should be grouped together. While the processing costs for only two features (with two combinations) is trivial, the number of combinations increases disproportionately with the number of features. For example, increasing the number of features to three yields six possible combinations {ABC, ACB, BAC, BCA, CAB, CBA}.

Various embodiments of the present invention are driven by two additional insights. First, sequences of features for individuals should be ordered consistently. Second, features should be listed in an order (ascending or descending) of how predictive they are with respect to the treatment of interest. Suppose that A is the most predictive feature with respect to effectiveness of a given treatment, B is the second most predictive, and so forth. Further, suppose that the individual for whom a treatment recommendation is sought exhibits particular values for features A, B, C, D, and E. However, there are (hypothetically) only ten people other than the individual who exhibit the same values for features A, B, C, D, and E. Those making the recommendation may require, for example, that there be at least 100 people in the decision group before the system can make a recommendation. Because each individual in the population is associated with values for features listed in descending order of their predictiveness, it is computationally efficient to first expand the decision group to ABCD #(where A, B, C, and D represent values for the features that match the individual's predictive feature values and #represents any value for features other than A, B, C, and D). If group ABCD #has less than 100 individuals, the decision group can be further expanded to ABC #(again, where A, B, and C represent values for the features that match the individual's predictive feature values and #represents any value for features other than A, B, and C). In this way, as feature specificity is decreased to achieve larger decision group sizes, the specificity is decreased in the way that maximizes the predictive power of the remaining features.

The methods of increasing the size of the decision group by sequentially removing features as criteria for inclusion ("feature pruning"), as described above, are a computationally efficient method of determining the maximally predictive decision group of a given size. However, with large numbers of features, the above methods may still be computationally expensive. Accordingly, various embodiments of the present invention utilize the additional insight that the set of features to which the feature pruning methods are applied may be a subset of all known features. The processes of reducing the number of features that are considered in subsequent processes (such as feature pruning) may be referred to as "dimensionality reduction." Like feature pruning, dimensionality reduction eliminates features of low predictive power from consideration for inclusion in the decision group. However, it does so using machine learning (ML) techniques.

A first dimensionality reduction method considers the predictive value of each available feature with respect to each of a plurality of treatments. There are multiple ways that the predictive values may be determined. In some embodiments, a measure of association for each feature-by-treatment combination is computed for each of treatment assignment (ITT output) and treatment effectiveness (outcomes model output). The pairs of measures of association (both ITT and outcomes) may then be combined in a variety of ways to approximate predictiveness. Alternatively, some embodiments determine a measure of association for each feature-by-treatment combination for treatment assignment (the ITT output) and then modify each of these measures of association according to the treatment's effectiveness for those exhibiting the feature in question. "Measures of association" could include, for example, measures of correlation, regression, covariance, or similar concepts. In some embodiments, the treatment assignment measures can be weights to the treatment effectiveness measures, for example in propensity matching measures or inverse propensity scoring measures. There are likely many methods that would lead to the intermediate result of approximating a predictive value of each feature on the effectiveness of each treatment.

Once there is a predictive value of each feature relative to the effectiveness of each treatment, the next step may in some embodiments be to determine which of the most predictive features will be considered in further analysis. Again, there are multiple ways of doing this. Various embodiments include considering a user-determined number or fraction of the most predictive features or setting a user-defined threshold of predictiveness for a feature to be considered.

A second method of dimensionality reduction involves repeating the first dimensionality reduction method (described above) multiple times on randomly selected subsets of a larger data set. For each repetition, the variables that remain (i.e., those that were not removed from consideration by the first dimensionality reduction method) are recorded. The number of features considered may be further reduced by setting a user-defined threshold for number or percentage of the random samplings in which a given feature remains.

In some embodiments, an exemplary proposed method may start with a request to the system for a treatment recommendation. The request may include an identifier for an individual, a condition to be treated, and a minimum number of individuals to be included in the decision group. The system may then associate the individual's identifier with a plurality of feature values stored in data. The system may also associate the condition to be treated with a plurality of drugs that could be used to treat the condition. For each of the identified drugs, the system may use an outcome model to determine how much of the variation in treatment effectiveness can be explained by each feature for which a value has been recorded for the individual. Similarly, for each of the identified drugs, the system may use an ITT model to determine how much of the variation in which individuals receive the drug can be explained by the feature. In some embodiments, the number of features analyzed for the individual may have been previously reduced using dimensionality reduction techniques such as those described under Problem 3 and Solution, above. The system then determines a composite score for each feature. The composite score is a function of the outcome model output and the ITT model output for the feature. There are countless ways in which a composite score could be determined that would yield some utility. Examples include, with respect to outcome and ITT outputs, a sum, a product, or a weighted average. The values for the features associated with the individual may then be ordered in ascending or descending order according to their respective composite scores. The composite scores may represent an approximation of the amount of variation of treatment effectiveness explained by the feature. In some embodiments, the composite score for a feature may be the magnitude of a coefficient from a regression model, or the importance score from a boosted tree model.

The next step of an exemplary proposed method may be to determine the decision group that will be considered in making the treatment recommendation for the individual. As described above, in some embodiments, the process expands the decision group by sequentially removing criteria for the currently least-predictive feature as a requirement for inclusion in the decision group. This sequential expansion may be repeated until a user-defined minimum sample size is achieved. Once the decision group is determined, an outcomes model may be applied to the decision group to determine a proportion of individuals in the decision group for whom the treatment under consideration was effective. In some embodiments, effectiveness may be represented as a binary determination. However, other embodiments may represent treatment effectiveness along a continuum. In some embodiments, multiple decision group sizes could be investigated to see if the recommended treatment is the same for increasingly larger sets of patients, and at what decision group size the treatment would change from the minimal decision group size's treatment.

The steps described above may be then repeated for each of the set of drugs that could be used to treat the individual's health condition. The result may be a probability of effectiveness for each drug in the set. In some embodiments, the system then recommends the drug with the highest probability of being effective. While the embodiment described here considers single drugs (i.e., not used in combination with other drugs), contemplated embodiments would include drug combinations. A combination of drugs may be assigned a probability of effectiveness using the same methods described here to determine a probability of effectiveness for a single particular drug.

Various embodiments of the present invention utilize a method that is configured to perform the below-noted operations: (i) counting a first set of data elements wherein each data element of the first set of data elements is associated with each feature of a first set of features; (ii) if an nth set of data elements associated with an nth set of features comprises fewer than a target quantity of data elements, counting an (n+1)th set of data elements wherein: (a) each data element of the (n+1)th set is associated with an (n+1)th set of features, (b) the (n+1)th set of features consists of each feature of the nth set of features except for an excluded feature, (c) the excluded feature is associated with a least predictiveness of the features of the nth set of features wherein the predictiveness is relative to an effectiveness of a tth treatment, and (d) n is a number that starts at 1 and increases by 1 with each repetition of step b of the method; (iii) repeating step (ii) of the method until the nth set of data elements comprises at least the target quantity of data elements; and (iv) generating an oth output wherein the oth output is determined using the (n+1)th set of data elements after the target quantity of data elements is achieved.

In some embodiments, the predictiveness of a feature is determined using an output of an ITT model relative to the tth treatment and an output of an outcomes model relative to the tth treatment. In some embodiments, the oth output is a probability of effectiveness of the tth treatment for data elements in the (n+1)th set of data elements after the target quantity of data elements is achieved. In some embodiments, the first set of features is ordered in either ascending order or descending order of the predictiveness.

In some embodiments, the first set of data elements is a subset of a total set of data elements; each data element of the total set of data elements is associated with one or more features of a total set of features; and the above-described method further comprises: determining the predictiveness of each feature of the total set of features relative to the effectiveness of the tth treatment; and including in the first set of features only features that satisfy a first set of one or more criteria. In some embodiments, the predictiveness of a feature is determined using an output of an ITT model relative to the tth treatment and an output of an outcomes model relative to the tth treatment. In some embodiments, the first set of one or more criteria comprise one or more of: a feature exceeds a user-defined predictiveness threshold; a feature is a member of G most-predictive features wherein G is a user-defined number; or a feature is a member of a Pth proportion of most-predictive features wherein P is a user-defined proportion. In some embodiments, the above-described method further comprises repeating steps e and f on multiple random samples of data elements from the total set of data elements; and including in the first set of features only features that satisfy a second set of one or more criteria. In some embodiments, the second set of one or more criteria comprise one or more of: a feature remains in at least G samples of the random samples wherein G is a user-defined number; or a feature remains in at least P percent of the random samples wherein P is a user-defined percentage.

II. Definitions

The term "predictive feature" may refer to a data construct that is configured to describe a feature that may be used as part of the predictive input for performing one or more predictive data analysis operations. A plurality of predictive features may in some embodiments be generated by performing intelligent feature selection from a plurality of initial predictive features, for example by excluding those initial predictive features that are deemed to be less significant relative to other initial predictive features. In some embodiments, each initial predictive feature is a one-hot-coded feature, such as a one-hot-coded feature describing whether the age of a predictive input entity satisfies an age threshold, a one-hot-coded feature describing gender of a predictive input entity, a one-hot-coded feature describing whether a predictive entity corresponding to a patient predictive entity has a recorded blood pressure that satisfies a recorded blood pressure threshold, a one-hot-coded feature describing whether a predictive entity corresponding to a patient predictive entity has a recorded history of heart surgery within the past two years, and/or the like. In some embodiments, to determine predictive features based at least in part on the initial predictive features, a computing entity may first perform a least absolute shrinkage and selection operator (LASSO) feature selection operation on the initial predictive features with respect to the plurality of ground-truth predictive outputs to generate a refined subset of the plurality of initial predictive feature values. Afterward, the computing entity determines, for each initial predictive feature value in the refined subset, a plurality of per-sample weight measures for the initial predictive feature value with respect to a plurality of sampled subsets of ground-truth training data. Thereafter, the computing entity determines, for each initial predictive feature value in the refined subset, whether to include the initial predictive feature value in a selected subset of the plurality of initial predictive feature values based at least in part on the plurality of per-sample weight measures for the particular initial predictive feature value.

The term "predictiveness measure" may refer to a data construct that is configured to describe how much a predictive feature that is associated with a corresponding predictive feature value contributes to one or more target predictive data analysis operations. For example, the predictiveness measure for a particular predictive feature value may describe at least one of the following: (i) how much the predictive feature that is associated with the particular predictive feature value contributes to generating an output of an assignment machine learning model (e.g., an intent-to-treat machine learning model), and (ii) how much the predictive feature that is associated with the particular predictive feature value contributes to generating an output of an outputs machine learning model. In some embodiments, determining a particular predictiveness measure for a particular predictive feature value comprises: for each prior predictive machine learning model of a plurality of prior predictive machine learning models (e.g., an assignment model, an outcomes model, and/or the like), determining a per-model feature weight value for the particular predictive feature value with respect to a per-model output of the prior predictive machine learning model; and determining the particular predictiveness measure based at least in part on each per-model feature weight value.

The term "decision subset" may refer to a data construct that is configured to describe a maximal set of predictive feature values for a predictive input whose corresponding feature coverage count satisfies a feature coverage count threshold. In some embodiments, determining the decision subset comprises performing one or more feature refinement routine iterations until a target feature refinement routine iteration in which a feature coverage count of the decision subset satisfies a feature coverage count threshold, and performing a current feature refinement routine iteration whose decision subset is associated with at least two predictive feature values comprises, in response to determining that the feature coverage count of the decision subset fails to satisfy the feature coverage count threshold: (i) modifying the decision subset to exclude the predictive feature value in the decision subset that has a lowest predictive measure relative to predictiveness measures that are associated with the decision subset, and (ii) performing a subsequent feature refinement routine iteration. In some embodiments, determining the decision subset comprises performing one or more feature refinement routine iterations until a target feature refinement routine iteration in which a feature coverage count of the decision subset satisfies a feature coverage count threshold, and performing a current feature refinement routine iteration comprises, in response to determining that the feature coverage count of the decision subset fails to satisfy the feature coverage count threshold and no defined stopping conditions have been satisfied: (i) modifying the decision subset to exclude the predictive feature value in the decision subset that has a lowest predictive measure relative to predictiveness measures that are associated with the decision subset, and (ii) performing a subsequent feature refinement routine iteration. Examples of stopping conditions include a stopping condition requiring that the feature refinement routine iterations be stopped and a current decision subset be adopted as the final decision subset if the count of predictive feature values in the current decision subset falls below a threshold count, such as two. In some embodiments, to generate the decision subset, a computing entity: (i) initializes a decision subset to comprise all of the plurality of predictive feature values, and (ii) performs one or more feature refinement routine iterations until a target feature refinement routine iteration in which a feature coverage count of the decision subset satisfies a feature coverage count threshold. In some embodiments, each feature refinement routine iteration comprises updating the decision subset to exclude the predictive feature value in the decision subset that has a lowest predictive measure relative to predictiveness measures that are associated with the decision subset if and only if the feature coverage count of the decision subset prior to the noted update fails to satisfy the feature coverage count threshold.

The term "feature refinement routine" may refer to a data construct that is configured to describe a computer-implemented process for iteratively refining a decision subset until one or more defined stopping conditions are met and/or the decision subset has a feature coverage count that satisfies a feature coverage count threshold. For example, given a predictive input that is associated with the plurality of predictive feature values $a\_b\_c\_d\_e$, a computing entity may first set the decision subset to comprise $a\_b\_c\_d\_e$. If the feature coverage count for the decision subset $a\_b\_c\_d\_e$ fails to satisfy a feature coverage count threshold (e.g., is below the feature coverage count threshold), then the computing entity may update the decision subset to comprise $a\_b\_c\_d$ and compute the feature coverage count for the decision subset $a\_b\_c\_d$. If the feature coverage count for the decision subset $a\_b\_c\_d$ fails to satisfy a feature coverage count threshold (e.g., is below the feature coverage count threshold), then the computing entity may update the decision subset to comprise $a\_b\_c$ and compute the feature coverage count for the decision subset $a\_b\_c$. If the feature coverage count for the decision subset $a\_b\_c$ fails to satisfy a feature coverage count threshold (e.g., is below the feature coverage count threshold), then the computing entity may update the decision subset to comprise $a\_b$ and compute the feature coverage count for the decision subset $a\_b$. If the feature coverage count for the decision subset $a\_b$ fails to satisfy a feature coverage count threshold (e.g., is below the feature coverage count threshold), then the computing entity may update the decision subset to comprise a and compute the feature coverage count for the decision subset a. In some embodiments, when the decision subset has only one predictive feature value, the computing entity adopts the decision subset as the final decision subset. In some embodiments, when the decision subset has only one predictive feature value but the feature coverage count for the decision subset fails to satisfy the feature coverage count threshold, the computing entity adopts an empty set as the decision subset.

The term "contribution direction consistency indicator" may refer to a data construct that is configured to describe whether a plurality of per-sample weight measures for a particular initial predictive feature value all have a common contribution direction. For example, in some embodiments, the contribution direction consistency indicator for a particular initial predictive feature value may have an affirmative value if all of the plurality of per-sample weight measures for the particular initial predictive feature value are positive-signed. As another example, in some embodiments, the contribution direction consistency indicator for a particular initial predictive feature value may have an affirmative value if all of the plurality of per-sample weight measures for the particular initial predictive feature value are negative-signed. As yet another example, in some embodiments, the contribution direction consistency indicator for a particular initial predictive feature value may have an affirmative value if all of the plurality of per-sample weight measures for the particular initial predictive feature value are positive-signed and are non-zero. As a further example, in some embodiments, the contribution direction consistency indicator for a particular initial predictive feature value may have an affirmative value if all of the plurality of per-sample weight measures for the particular initial predictive feature value are positive-signed and non-zero or negative-signed. As an additional example, in some embodiments, the contribution direction consistency indicator for a particular initial predictive feature value may have an affirmative value if all of the plurality of per-sample weight measures for the particular initial predictive feature value are within a defined range.

The term "sampling contribution relevance count" may refer to a data construct that is configured to describe how many per-sample weight measures for a particular initial predictive feature value satisfy a per-sample weight measure threshold. For example, if a particular initial predictive feature value is associated with the per-sample weight measures {0.3, 0.6, 0.5, 0.7}, and if the per-sample weight measure threshold is satisfied when a per-sample weight measure is equal to or above 0.5, then the sampling contribution relevance count for the noted particular initial predictive feature value is three. As another example, if a particular initial predictive feature value is associated with the per-sample weight measures {0.3, 0.6, 0.5, 0.7}, and if the per-sample weight measure threshold is satisfied when a per-sample weight measure is strictly above 0.5, then the sampling contribution relevance count for the noted particular initial predictive feature value is two.

The term "prior predictive machine learning model" may refer to a data construct that is configured to describe parameters, hyper-parameters, and/or defined operations of a trained machine learning model (e.g., a trained regression-based machine learning model, such as a trained linear regression model and/or a trained polynomial regression model) whose generated weight values for particular predictive features can be used to determine predictiveness measures for the noted predictive feature values. Examples of prior predictive machine learning models include assignment machine learning models and outputs machine learning models. While examples of prior predictive machine learning models are described herein, a person of ordinary skill in the relevant technology will recognize that any prior predictive model can be used in various embodiments of the present invention. In some embodiments, an input to a prior predictive machine learning model include a vector describing the predictive feature values of a predictive input. In some embodiments, outputs of a prior predictive machine learning model include a vector describing a predictive output for a corresponding predictive input and/or an atomic value describing a predictive output for a corresponding predictive input. In some embodiments, a prior predictive machine learning model is a classification machine learning model.

The term "assignment machine learning model" may refer to a prior predictive machine learning model that is configured to determine, for a given predictive input having a set of predictive feature values, the likelihood that a predictive entity (e.g., a patient identifier) associated with the predictive input should be assigned to a particular action category (e.g., to a particular medication/treatment category). An example of an assignment machine learning model is an intent-to-treat model that is configured to determine the likelihood that a patient identifier should be assigned to a particular medication/treatment category. The assignment machine learning model may be associated with a set of predictive features and may have, for each predictive feature, a per-model feature weight value that describes the weight assigned to the particular predictive feature in performing predictive inferences of the assignment machine learning model. For example, given an assignment machine learning model that is an intent-to-treat machine learning model (e.g., a regression-based intent-to-treat machine learning model) and a predictive feature describing gender of an predictive input for a patient identifier, the per-model feature weight value for the noted predictive feature may describe a computed correlation between gender of patient identifiers and whether the patient identifiers should be recommended to receive the treatment/medication that is associated with the intent-to-treat machine learning model.

The term "outputs machine learning model" may refer to a prior predictive machine learning model that is configured to determine, for a given predictive input having a set of predictive feature values, the likelihood that a predictive entity (e.g., a patient identifier) associated with the predictive input will achieve a target outcome if assigned to a particular action category (e.g., to a particular medication/treatment category). For example, an outputs machine learning model may determine the likelihood that, if a patient identifier is assigned to a particular medication/treatment category, that a target outcome occurs with respect to the patient identifier. Like assignment machine learning models, outputs machine learning models may have per-model feature weights that describe how predictively significant particular predictive features are to performing the predictive data analysis operations of the outputs machine learning model. For example, an outputs machine learning model that is configured to receive gender as a predictive feature in order to generate a likelihood that, once a particular patient identifier is assigned to a particular medication/treatment, the particular patient identifier will achieve a target outcome may be associated with a per-model feature weight describing a computed significance of the gender predictive feature value to the output likelihood.

The term "per-model feature weight value" may refer to a data construct that is configured to describe a computed significance of the particular predictive feature to a per-model output of the prior predictive machine learning model. For example, given an assignment machine learning model that is an intent-to-treat machine learning model (e.g., a regression-based intent-to-treat machine learning model) and a predictive feature describing gender of an predictive input for a patient identifier, the per-model feature weight value for the noted predictive feature may describe a computed correlation between gender of patient identifiers and whether the patient identifiers should be recommended to receive the treatment/medication that is associated with the intent-to-treat machine learning model. As another example, an outputs machine learning model that is configured to receive gender as a predictive feature in order to generate a likelihood that, once a particular patient identifier is assigned to a particular medication/treatment, the particular patient identifier will achieve a target outcome may be associated with a per-model feature weight describing a computed significance of the gender predictive feature value to the output likelihood.

The term "predictive feature hierarchy" may refer to a data construct that is configured to describe a tree structure having a plurality of nodes (e.g., a set of nodes excluding a root node) and a plurality of directed edges, where: (i) each node of the plurality of nodes corresponds to a qualified feature permutation, and (ii) each directed edge from a first node to a second node describes that the qualified feature permutation for the first node is a "parent" of the qualified feature permutation for the second node such that the "child" qualified feature permutation includes all of the predictive feature values of the "parent" qualified feature permutation plus one or more other predictive feature values. The predictive feature hierarchy may in some embodiments further describe the feature coverage count for each qualified feature permutation as node feature data for the corresponding node.

The term "qualified feature permutation" may refer to a data construct that is configured to describe a permutation of a plurality of predictive feature that is generated in a manner such that, in the linear order of the qualified feature permutation, no predictive feature comes after another predictive feature that has a lower predictiveness measure with respect to the predictive feature. For example, the permutation $\{f_1, f_2, f_3\}$ would be a qualified feature permutation if the predictiveness measure of $f_1$ is higher than the predictiveness measure of $f_2$, and the predictiveness measure of $f_2$ is higher than the predictiveness measure of $f_3$. In some embodiments, each qualified feature permutation will be assigned to a node of the predictive feature hierarchy, as further described below.

The term "feature coverage count" may refer to a data construct that is configured to describe a count of a plurality of ground-truth predictive inputs that satisfy a corresponding qualified feature permutation. For example, if a qualified feature permutation refers to {gender_male=TRUE, age_over30=TRUE, cigarette_smoke_history_last2 years=TRUE}, then the feature coverage count for the qualified feature permutation may describe a count of patient identifiers having ground-truth treatment/outcome data that are associated with men over 30 and have a history of smoking cigarette in the last two years. In some embodiments, each qualified feature permutation includes a raw feature coverage count that describes a count of a plurality of ground-truth predictive inputs that satisfy the predictive feature values in the qualified feature permutation but not other predictive feature values outside of the qualified feature permutation. For example, if a qualified feature permutation refers to {gender_male=TRUE, age_over30=TRUE, cigarette_smoke_history_last2 years=TRUE}, then the raw feature coverage count for the noted qualified feature permutation may describe a count of patient identifiers having ground-truth treatment/outcome data that are men over 30 and have a history of smoking cigarette in the last two years, but may not include those patient identifiers having ground-truth treatment/outcome data that are men over 30, have a history of smoking cigarette in the last two years, and live in California. In some of the noted embodiments, the feature coverage count for the qualified feature permutation {gender_male=TRUE, age_over30=TRUE, cigarette_smoke_history_last2 years=TRUE} may be generated by adding, to the raw feature coverage count for the qualified feature permutation, all raw feature coverage counts for those "children" qualified feature permutations that are wholly inclusive of the particular qualified feature permutation but that include additional predictive feature values, such as the qualified feature permutation {gender_male=TRUE, age_over30=TRUE, cigarette_smoke_history_last2 years=TRUE, California_resident=TRUE}.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis with respect to categorical data objects. The architecture 100 includes a predictive data analysis system 101 configured to receive predictive data analysis requests from external computing entities 102, process the predictive data analysis requests to generate predictive outputs, provide the generated predictive outputs to the external computing entities 102, and automatically perform prediction-based actions based at least in part on the generated predictive outputs. Examples of predictive data analysis requests that may be processed by the predictive data analysis system 101 include request for generating a recommendation score for each medication/treatment regimen of a set of candidate medication/treatment regimens for a particular patient identifier.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive structured data predictive data analysis requests from one or more external computing entities 102, process the predictive data analysis requests to generate the predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis tasks as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 200 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 190, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 200 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

B. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention address technical challenges associated with performing predictive data analysis (e.g., machine learning) operations in feature spaces having a high number of categorical predictive features by introducing techniques for intelligently selecting decision subsets of categorical predictive features using iterative feature refinement operations. The noted techniques enable limiting traversals of a training set characterized by a high number of categorical predictive features to a maximal set of categorical predictive features that are associated with at least a threshold number of training entries. This in turn means that, instead of having to traverse all of the training entries to perform predictive data analysis operations, a proposed solution may simply select a subset of the training entries that satisfy the maximal set (and are thus selected in a manner that is configured to minimize the number of the selected training entries). As a result, predictive data analysis operations can be performed more efficiently by focusing on an intelligently-selected subset of the training data, not the entirety of the training data. In this way, various embodiments of the present invention make substantial improvements to the efficiency of predictive data analysis (e.g., machine learning) operations in feature spaces that have a high number of categorical predictive features.

FIG. 4 is a flowchart diagram of an example process 400 for a predictive feature hierarchy for a plurality of predictive features. Via the various steps/operations of the process 400, the predictive data analysis computing entity 106 can generate a predictive feature hierarchy which can then be used to generate a decision group for a predictive input with linear computational complexity.

The process 400 begins at step/operation 401 begins at step/operation 401 when the predictive data analysis computing entity 106 identifies the plurality of predictive feature values that are associated with a plurality of predictive features. As described below, the plurality of predictive features may in some embodiments be generated by performing intelligent feature selection from a plurality of initial predictive features, for example by excluding those initial predictive features that are deemed to be less significant relative to other initial predictive features.

In some embodiments, step/operation 401 may be performed in accordance with the process that is depicted in FIG. 5. The process that is depicted in FIG. 5 begins at step/operation 501 when the predictive data analysis computing entity 106 identifies a plurality of initial predictive feature values that are associated with a plurality of initial predictive features. In some embodiments, each initial predictive feature is a one-hot-coded feature, such as a one-hot-coded feature describing whether the age of a predictive input entity satisfies an age threshold, a one-hot-coded feature describing gender of a predictive input entity, a one-hot-coded feature describing whether a predictive entity corresponding to a patient predictive entity has a recorded blood pressure that satisfies a recorded blood pressure threshold, a one-hot-coded feature describing whether a predictive entity corresponding to a patient predictive entity has a recorded history of heart surgery within the past two years, and/or the like.

At step/operation 502, the predictive data analysis computing entity 106 identifies a plurality of ground-truth predictive entities that are associated with a plurality of ground-truth predictive outputs. In some embodiments, a ground-truth predictive entity describes a set of predictive feature values corresponding to the plurality of initial predictive features that are deemed to be associated with to a common entity (e.g., a common-real-world entity, such a particular patient identifier). In some embodiments, each ground-truth predictive entity is associated with a ground-truth predictive output, such as a ground-truth predictive output describing whether a patient identifier associated with the ground-truth predictive entity has been prescribed a particular medication/treatment and/or whether use of a particular medication/treatment by a patient identifier associated with the ground-truth predictive entity has generated a desirable/target outcome.

At step/operation 503, the predictive data analysis computing entity 106 generates a plurality of sampled subsets of the plurality of ground-truth predictive outputs. In some embodiments, one objective of the step/operation 503 is to ensure that the initial predictive feature values in the refined subset are filtered in a manner that is configured to decrease the likelihood that the initial predictive feature values in the refined subset generate a model that overfits to the holistic set of ground-truth predictive outputs. Therefore, in some embodiments, a set of n-sized samples of the ground-truth predictive outputs are selected in a randomized manner, where n may be variable for different selected samples. In some embodiments, to generate the plurality of sampled subsets, values of are n selected from a range {a, a+1, ... a+d} (e.g., the range {1, 2, ... 10}), and for each n, a defined number of sampled subsets having the size n are selected. In some embodiments, to generate each sampled subset, a value of n is randomly selected from a defined range, and then an n-sized sample of the ground-truth predictive outputs is selected in a randomized manner.

At step/operation 504, the predictive data analysis computing entity 106 determines, for each initial predictive feature value, a plurality of per-sample weight measures for the initial predictive feature value with respect to the plurality of sampled subsets. In some embodiments, for each feature-sample pair that is associated with an initial predictive feature value and a sampled subset, a per-sample weight measure that describes the correlation of a predictive feature that is associated with the initial predictive feature value in relation to a dataset that is associated with the sampled subset. For example, given a feature-sample pair that is associated with a gender-related predictive feature value and a sampled subset comprising the ground-truth predictive outputs $\{g_1, g_2, g_3\}$ for ground-truth predictive entities $\{e_1, e_2, e_3\}$, the predictive data analysis computing entity 106 may determine the corresponding per-sample weight measure based at least in part on a correlation value (e.g., a regression coefficient) describing how much the gender values for $\{e_1, e_2, e_3\}$ contribute to the outputs $\{g_1, g_2, g_3\}$.

At step/operation 505, the predictive data analysis computing entity 106 determines, for each initial predictive feature value, whether to include the initial predictive feature value in a refined subset of the plurality of initial predictive feature values based at least in part on the plurality of per-sample weight measures for the initial predictive feature value. In some embodiments, the predictive data analysis computing entity 106 detects whether the plurality of per-sample weight measures for an initial predictive feature value satisfy one or more desired/target patterns, and if so determines that the noted initial predictive feature value should be included in the refined subset. For example, in some embodiments, the predictive data analysis computing entity 106 determines that a particular initial predictive feature value should be in a refined subset of initial predictive feature values if a contribution direction consistency indicator for the initial predictive feature value describes that all of the plurality of per-sample weight measures have a common mathematical sign (i.e., have a positive sign or a have a negative sign). As another example, in some embodiments, the predictive data analysis computing entity 106 determines that a particular initial predictive feature value should be in a refined subset of initial predictive feature values if a sampling contribution relevance count satisfies a sampling contribution relevance count threshold. As yet another example, in some embodiments, the predictive data analysis computing entity 106 determines that a particular initial predictive feature value should be in a refined subset of initial predictive feature values if: (i) a contribution direction consistency indicator for the initial predictive feature value describes that all of the plurality of per-sample weight measures have a common mathematical sign (i.e., have a positive sign or a have a negative sign), and (ii) sampling contribution relevance count satisfies a sampling contribution relevance count threshold.

In some embodiments, a contribution direction consistency indicator describes whether a plurality of per-sample weight measures for a particular initial predictive feature value all have a common contribution direction. For example, in some embodiments, the contribution direction consistency indicator for a particular initial predictive feature value may have an affirmative value if all of the plurality of per-sample weight measures for the particular initial predictive feature value are positive-signed. As another example, in some embodiments, the contribution direction consistency indicator for a particular initial predictive feature value may have an affirmative value if all of the plurality of per-sample weight measures for the particular initial predictive feature value are negative-signed. As yet another example, in some embodiments, the contribution direction consistency indicator for a particular initial predictive feature value may have an affirmative value if all of the plurality of per-sample weight measures for the particular initial predictive feature value are positive-signed and are non-zero. As a further example, in some embodiments, the contribution direction consistency indicator for a particular initial predictive feature value may have an affirmative value if all of the plurality of per-sample weight measures for the particular initial predictive feature value are positive-signed and non-zero or negative-signed. As described above, in some embodiments, the predictive data analysis computing entity 106 determines whether to include a particular initial predictive feature value in a selected subset of the initial predictive feature values based at least in part on the contribution direction consistency indicator for the particular initial predictive feature value.

In some embodiments, a sampling contribution relevance count describes how many per-sample weight measures for a particular initial predictive feature value satisfy a per-sample weight measure threshold. For example, if a particular initial predictive feature value is associated with the per-sample weight measures {0.3, 0.6, 0.5, 0.7}, and if the per-sample weight measure threshold is satisfied when a per-sample weight measure is equal to or above 0.5, then the sampling contribution relevance count for the noted particular initial predictive feature value is three. As another example, if a particular initial predictive feature value is associated with the per-sample weight measures {0.3, 0.6, 0.5, 0.7}, and if the per-sample weight measure threshold is satisfied when a per-sample weight measure is strictly above 0.5, then the sampling contribution relevance count for the noted particular initial predictive feature value is two. As described above, in some embodiments, the predictive data analysis computing entity 106 determines whether to include a particular initial predictive feature value in a selected subset of the initial predictive feature values based at least in part on the sampling contribution relevance count for the particular initial predictive feature value.

At step/operation 506, the predictive data analysis computing entity 106 performs a least absolute shrinkage and selection operator (LASSO) feature selection operation on the plurality of initial predictive features in the refined subset with respect to the plurality of ground-truth predictive outputs to generate a selected subset of the plurality of initial predictive feature values. In some embodiments, the LASSO feature selection operation eliminates those initial predictive feature values whose correlation with the plurality of ground-truth predictive outputs fails to satisfy a correlation threshold. Therefore, in at least some embodiments, the LASSO feature selection operation is configured to eliminate those features having a marginal predictive significance from the initial predictive feature values in the refined subset in order to generate the refined subset of the initial predictive feature values. In some embodiments, step/operation 506 is skipped, and the selected subset is determined directly based on the refined subset. In some embodiments, step/operation 506 includes performing feature selection operations in addition to or instead of the LASSO feature selection operation.

At step/operation 507, the predictive data analysis computing entity 106 determines the predictive feature values based at least in part on the selected subset of the initial predictive feature values. In some embodiments, the predictive data analysis computing entity 106 adopts those initial predictive feature values that are in the selected subset as the final set of predictive feature values. In some embodiments, the predictive data analysis computing entity 106 performs one or more additional feature refinement operations on those initial predictive feature values that are in the selected subset to generate at least a portion of the final set of predictive feature values. In some embodiments, the predictive data analysis computing entity 106 performs one or more feature transformation operations on those initial predictive feature values that are in the selected subset to generate at least a portion of the final set of predictive feature values. In some embodiments, the predictive data analysis computing entity 106 performs one or more feature engineering operations on those initial predictive feature values that are in the selected subset to generate at least a portion of the final set of predictive feature values.

Returning to FIG. 4, at step/operation 402, the predictive data analysis computing entity 106 generates a predictiveness measure for each predictive feature value. In some embodiments, the predictiveness measure for a predictive feature value describes how much the predictive feature that is associated with the noted predictive feature value contributes to one or more target predictive data analysis operations. For example, the predictiveness measure for a particular predictive feature value may describe at least one of the following: (i) how much the predictive feature that is associated with the particular predictive feature value contributes to generating an output of an assignment machine learning model (e.g., an intent-to-treat machine learning model), and (ii) how much the predictive feature that is associated with the particular predictive feature value contributes to generating an output of an outputs machine learning model.

In some embodiments, step/operation 402 may be performed in accordance with the process that is depicted in FIG. 6, which is an example process for generating a predictiveness measure for a particular predictive feature value that is associated with a particular predictive feature. The process that is depicted in FIG. 6 begins at step/operation 601 when the predictive data analysis computing entity 106 identifies a plurality of prior predictive machine learning models. In some embodiments, a prior predictive machine learning model is a trained machine learning model whose generated weight values for particular predictive features can be used to determine predictiveness measures for the noted predictive feature values. While examples of prior predictive machine learning models are described below, a person of ordinary skill in the relevant technology will recognize that any prior predictive model can be used in various embodiments of the present invention.

An example of a prior predictive machine learning model is an assignment machine learning model that is configured to determine, for a given predictive input having a set of predictive feature values, the likelihood that a predictive entity (e.g., a patient identifier) associated with the predictive input should be assigned to a particular action category (e.g., to a particular medication/treatment category). An example of an assignment machine learning model is an intent-to-treat model that is configured to determine the likelihood that a patient identifier should be assigned to a particular medication/treatment category. The assignment machine learning model may be associated with a set of predictive features and may have, for each predictive feature, a per-model feature weight value that describes the weight assigned to the particular predictive feature in performing predictive inferences of the assignment machine learning model. For example, given an assignment machine learning model that is an intent-to-treat machine learning model (e.g., a regression-based intent-to-treat machine learning model) and a predictive feature describing gender of an predictive input for a patient identifier, the per-model feature weight value for the noted predictive feature may describe a computed correlation between gender of patient identifiers and whether the patient identifiers should be recommended to receive the treatment/medication that is associated with the intent-to-treat machine learning model.

Another example of a prior predictive machine learning model is an outputs machine learning model that is configured to determine, for a given predictive input having a set of predictive feature values, the likelihood that a predictive entity (e.g., a patient identifier) associated with the predictive input will achieve a target outcome if assigned to a particular action category (e.g., to a particular medication/treatment category). For example, an outputs machine learning model may determine the likelihood that, if a patient identifier is assigned to a particular medication/treatment category, that a target outcome occurs with respect to the patient identifier. Like assignment machine learning models, outputs machine learning models may have per-model feature weights that describe how predictively significant particular predictive features are to performing the predictive data analysis operations of the outputs machine learning model. For example, an outputs machine learning model that is configured to receive gender as a predictive feature in order to generate a likelihood that, once a particular patient identifier is assigned to a particular medication/treatment, the particular patient identifier will achieve a target outcome may be associated with a per-model feature weight describing a computed significance of the gender predictive feature value to the output likelihood.

At step/operation 602, the predictive data analysis computing entity 106 determines, for each prior predictive machine learning model, an initial per-model feature weight value that describes a computed significance of the particular predictive feature to a per-model output of the prior predictive machine learning model. For example, given an assignment machine learning model that is an intent-to-treat machine learning model (e.g., a regression-based intent-to-treat machine learning model) and a predictive feature describing gender of an predictive input for a patient identifier, the per-model feature weight value for the noted predictive feature may describe a computed correlation between gender of patient identifiers and whether the patient identifiers should be recommended to receive the treatment/medication that is associated with the intent-to-treat machine learning model. As another example, an outputs machine learning model that is configured to receive gender as a predictive feature in order to generate a likelihood that, once a particular patient identifier is assigned to a particular medication/treatment, the particular patient identifier will achieve a target outcome may be associated with a per-model feature weight describing a computed significance of the gender predictive feature value to the output likelihood.

At step/operation 603, the predictive data analysis computing entity 106 normalizes the per-model feature weight values for the particular predictive feature value in order to generate a plurality of normalized per-model feature weight values for the particular predictive feature value. For example, given a per-model feature weight value $w_d$ for a prior predictive model $M_1$ that is associated with per-model feature weight values $\{w_1, \ldots, w_n\}$ for n predictive features, the predictive data analysis computing entity 106 may normalize $w_d$ with respect to $\{w_1, \ldots, w_n\}$ in order to generate a normalized per-model feature weight value. Examples of normalization operations include softmax normalization, normalization by dividing $w_d$ by the sum of $\{w_1, \ldots, w_n\}$, and/or the like. One objective of this normalization is to ensure that different per-model feature weight values for a particular predictive feature value that originate from different prior predictive machine learning models come from a common numerical range, such that no per-model feature weight value can dominate the generation of the composite feature weight values as described in greater detail below.

At step/operation 604, the predictive data analysis computing entity 106 combines the plurality of normalized per-model feature weight values for the particular predictive feature value in order to generate a composite feature weight value for the particular predictive feature value. For example, the predictive data analysis computing entity 106 may average the plurality of normalized per-model feature weight values for the particular predictive feature value in order to generate a composite feature weight value for the particular predictive feature value. As another example, For example, the predictive data analysis computing entity 106 may generate a median of the plurality of normalized per-model feature weight values for the particular predictive feature value as a composite feature weight value for the particular predictive feature value. As yet another example, For example, the predictive data analysis computing entity 106 may generate a weighted mean of the plurality of normalized per-model feature weight values for the particular predictive feature value as a composite feature weight value for the particular predictive feature value. As a further example, For example, the predictive data analysis computing entity 106 may generate a mode of the plurality of normalized per-model feature weight values for the particular predictive feature value as a composite feature weight value for the particular predictive feature value.

At step/operation 605, the predictive data analysis computing entity 106 determines the predictiveness measure for the particular predictive feature value based at least in part on the composite feature weight value for the predictive feature weight value. In some embodiments, the predictive data analysis computing entity 106 adopts the composite feature weight value for the predictive feature weight value as the predictiveness measure for the particular predictive feature value. In some embodiments, the predictive data analysis computing entity 106 performs one or more additional data processing operations on the composite feature weight value for the predictive feature weight value to generate the predictiveness measure for the particular predictive feature value.

Returning to FIG. 4, at step/operation 403, the predictive data analysis computing entity 106 generates a plurality of qualified feature permutations for the plurality of predictive features that are associated with the plurality of predictive feature values. In some embodiments, a qualified feature permutation is a permutation of the plurality of predictive feature that is generated in a manner such that, in the linear order of the qualified feature permutation, no predictive feature comes after another predictive feature that has a lower predictiveness measure with respect to the predictive feature. For example, the permutation $\{f_1, f_2, f_3\}$ would be a qualified feature permutation if the predictiveness measure of $f_1$ is higher than the predictiveness measure of $f_2$, and the predictiveness measure of $f_2$ is higher than the predictiveness measure of $f_3$. In some embodiments, each qualified feature permutation will be assigned to a node of the predictive feature hierarchy, as further described below.

At step/operation 404, the predictive data analysis computing entity 106 determines, for each qualified feature permutation, a feature coverage count that describes a count of a plurality of ground-truth predictive inputs that satisfy the qualified feature permutation. For example, if a qualified feature permutation refers to {gender_male=TRUE, age_over30=TRUE, cigarette_smoke_history_last2 years=TRUE}, then the feature coverage count for the qualified feature permutation may describe a count of patient identifiers having ground-truth treatment/outcome data that are associated with men over 30 and have a history of smoking cigarette in the last two years.

In some embodiments, each qualified feature permutation includes a raw feature coverage count that describes a count of a plurality of ground-truth predictive inputs that satisfy the predictive feature values in the qualified feature permutation but not other predictive feature values outside of the qualified feature permutation. For example, if a qualified feature permutation refers to {gender_male=TRUE, age_over30=TRUE, cigarette_smoke_history_last2 years=TRUE}, then the raw feature coverage count for the noted qualified feature permutation may describe a count of patient identifiers having ground-truth treatment/outcome data that are men over 30 and have a history of smoking cigarette in the last two years, but may not include those patient identifiers having ground-truth treatment/outcome data that are men over 30, have a history of smoking cigarette in the last two years, and live in California. In some of the noted embodiments, the feature coverage count for the qualified feature permutation {gender_male=TRUE, age_over30=TRUE, cigarette_smoke_history_last2 years=TRUE} may be generated by adding, to the raw feature coverage count for the qualified feature permutation, all raw feature coverage counts for those "children" qualified feature permutations that are wholly inclusive of the particular qualified feature permutation but that include additional predictive feature values, such as the qualified feature permutation {gender_male=TRUE, age_over30=TRUE, cigarette_smoke_history_last2 years=TRUE, California_resident=TRUE}.

At step/operation 405, the predictive data analysis computing entity 106 generates the predictive feature hierarchy based at least in part on each feature coverage count for a qualified feature permutation. In some embodiments, the predictive feature hierarchy is a tree structure having a plurality of nodes (e.g., a set of nodes excluding a root node) and a plurality of directed edges, where: (i) each node corresponds to a qualified feature permutation, and (ii) each directed edge from a first node to a second node describes that the qualified feature permutation for the first node is a "parent" of the qualified feature permutation for the second node such that the "child" qualified feature permutation includes all of the predictive feature values of the "parent" qualified feature permutation plus one or more other predictive feature values. In some embodiments, the predictive feature hierarchy further describes the feature coverage count for each qualified feature permutation as node feature data for the corresponding node.

An operational example of a predictive feature hierarchy 700 is depicted in FIG. 7. As depicted in FIG. 7, each non-root node correspond to a qualified feature permutation. For example, the non-root node 701 corresponds to the qualified feature permutation a_b_c_d_e (which may be read as {a_feature=TRUE, b_feature=TRUE, c_feature=TRUE, d_feature=TRUE, e_feature=TRUE}). As described above, having a qualified feature permutation a_b_c_d_e indicates that the predictive feature e_feature has a predictiveness measure that fails to exceed the predictiveness measure of d_feature, the predictiveness measure of c_feature, the predictiveness measure of b_feature, and the predictiveness measure of e_feature. Accordingly, there are no nodes in the predictive feature hierarchy 700 for those feature permutations in which e precedes a, b, c, or d. As another example, the non-root node 702 corresponds to the qualified feature permutation a_b_c_d (which may be read as {a_feature=TRUE, b_feature=TRUE, c_feature=TRUE, d_feature=TRUE}. This indicates that the qualified feature permutation corresponding to the non-root node 702 is a parent of the qualified feature permutation corresponding to the non-root node 701, and conversely that the qualified feature permutation corresponding to the non-root node 701 is a child of the qualified feature permutation corresponding to the non-root node 702. This is because the qualified feature permutation a_b_c_d_e has every predictive feature value of the qualified feature permutation a_b_c_d, plus the additional predictive feature value of e. Using at least some of the steps/operations described herein, the predictive feature hierarchy 700 may be generated based at least in part on the raw feature coverage counts 801 for a set of defined qualified feature permutations 802 that are depicted in FIG. 8.

Once generated, the predictive feature hierarchy may be used to perform predictive data analysis operations to generate a predictive output for a predictive input, for example in accordance with the process 900 that is depicted in FIG. 9. The process 900 that is depicted in FIG. 9 begins at step/operation 901 when the predictive data analysis computing entity 106 receives a predictive input that is associated with a plurality of predictive feature values. For example, the predictive data analysis computing entity 106 may receive a predictive input that is associated with the plurality of predictive feature values a_b_c_d_e.

Via the various steps/operations of the process 900, various embodiments of the present invention address technical challenges associated with performing predictive data analysis (e.g., machine learning) operations in feature spaces having a high number of categorical predictive features by introducing techniques for intelligently selecting decision subsets of categorical predictive features using iterative feature refinement operations. The noted techniques enable limiting traversals of a training set characterized by a high number of categorical predictive features to a maximal set of categorical predictive features that are associated with at least a threshold number of training entries. This in turn means that, instead of having to traverse all of the training entries to perform predictive data analysis operations, a proposed solution may simply select a subset of the training entries that satisfy the maximal set (and are thus selected in a manner that is configured to minimize the number of the selected training entries). As a result, predictive data analysis operations can be performed more efficiently by focusing on an intelligently-selected subset of the training data, not the entirety of the training data. In this way, various embodiments of the present invention make substantial improvements to the efficiency of predictive data analysis (e.g., machine learning) operations in feature spaces that have a high number of categorical predictive features.

At step/operation 902, the predictive data analysis computing entity 106 determines a decision subset for the predictive input. In some embodiments, to generate the decision subset, the predictive data analysis computing entity 106: (i) initializes a decision subset to comprise all of the plurality of predictive feature values a_b_c_d_e, and (ii) performs one or more feature refinement routine iterations until a target feature refinement routine iteration in which a feature coverage count of the decision subset satisfies a feature coverage count threshold. In some embodiments, each feature refinement routine iteration comprises updating the decision subset to exclude the predictive feature value in the decision subset that has a lowest predictive measure relative to predictiveness measures that are associated with the decision subset if and only if the feature coverage count of the decision subset prior to the noted update fails to satisfy the feature coverage count threshold.

For example, given a predictive input that is associated with the plurality of predictive feature values a_b_c_d_e, the predictive data analysis computing entity 106 first sets the decision subset to comprise a_b_c_d_e. If the feature coverage count for the decision subset a_b_c_d_e fails to satisfy a feature coverage count threshold (e.g., is below the feature coverage count threshold), then the predictive data analysis computing entity 106 updates the decision subset to comprise a_b_c_d and computes the feature coverage count for the decision subset a_b_c_d. If the feature coverage count for the decision subset a_b_c_d fails to satisfy a feature coverage count threshold (e.g., is below the feature coverage count threshold), then the predictive data analysis computing entity 106 updates the decision subset to comprise a_b_c and computes the feature coverage count for the decision subset a_b_c. If the feature coverage count for the decision subset a_b_c fails to satisfy a feature coverage count threshold (e.g., is below the feature coverage count threshold), then the predictive data analysis computing entity 106 updates the decision subset to comprise a_b and computes the feature coverage count for the decision subset a_b. If the feature coverage count for the decision subset a_b fails to satisfy a feature coverage count threshold (e.g., is below the feature coverage count threshold), then the predictive data analysis computing entity 106 updates the decision subset to comprise a and computes the feature coverage count for the decision subset a. In some embodiments, when the decision subset has only one predictive feature value, the predictive data analysis computing entity 106 adopts the decision subset as the final decision subset. In some embodiments, when the decision subset has only one predictive feature value but the feature coverage count for the decision subset fails to satisfy the feature coverage count threshold, the predictive data analysis computing entity 106 adopts an empty set as the decision subset.

Accordingly, in some embodiments, determining the decision subset comprises performing one or more feature refinement routine iterations until a target feature refinement routine iteration in which a feature coverage count of the decision subset satisfies a feature coverage count threshold, and performing a current feature refinement routine iteration whose decision subset is associated with at least two predictive feature values comprises, in response to determining that the feature coverage count of the decision subset fails to satisfy the feature coverage count threshold: (i) modifying the decision subset to exclude the predictive feature value in the decision subset that has a lowest predictive measure relative to predictiveness measures that are associated with the decision subset, and (ii) performing a subsequent feature refinement routine iteration.

Moreover, in some embodiments, determining the decision subset comprises performing one or more feature refinement routine iterations until a target feature refinement routine iteration in which a feature coverage count of the decision subset satisfies a feature coverage count threshold, and performing a current feature refinement routine iteration comprises, in response to determining that the feature coverage count of the decision subset fails to satisfy the feature coverage count threshold and no defined stopping conditions have been satisfied: (i) modifying the decision subset to exclude the predictive feature value in the decision subset that has a lowest predictive measure relative to predictiveness measures that are associated with the decision subset, and (ii) performing a subsequent feature refinement routine iteration. Examples of stopping conditions include a stopping condition requiring that the feature refinement routine iterations be stopped and a current decision subset be adopted as the final decision subset if the count of predictive feature values in the current decision subset falls below a threshold count, such as two.

A predictive feature hierarchy can be used to determine the decision subset for a predictive input. This may include: (i) identifying a qualified feature permutation for the predictive input that includes all of the predictive feature values of the predictive input and/or that includes a maximal number of the predictive feature values of the predictive input among the qualified feature permutations having nodes in the predictive feature hierarchy, (ii) identifying a node of the predictive feature hierarchy for the noted qualified feature permutation, and (iii) traversing the predictive feature hierarchy upward as many times as needed until either a stopping condition is met or a node is reached whose qualified feature permutation has a feature coverage count that satisfies a feature coverage count threshold.

At step/operation 903, the predictive data analysis computing entity 106 determines the predictive output based at least in part on one or more detected patterns for the decision subset. In some embodiments, the predictive data analysis computing entity 106 may determine the predictive output based at least in part on one or more detected patterns across all predictive entities (e.g., patients) that satisfy the predictive feature values in the decision subset. For example, the predictive data analysis computing entity 106 may determine the predictive output based at least in part on a ratio of the predictive entities (e.g., patients) that satisfy the predictive feature values in the decision subset that have been assigned a particular medication/treatment or have achieved a particular outcome after being assigned the particular medication/treatment.

At step/operation 904, the predictive data analysis computing entity 106 performs one or more prediction-based actions based at least in part on the predictive output. In some embodiments, the predictive output is selected from a plurality of candidate predictive outputs for the predictive input; and the one or more prediction-based actions are performed from a highest predictive output of the plurality of predictive outputs.

For example, each predictive data analysis computing entity 106 may determine a predictive output for a patient identifier with respect to each medication/treatment regimen that describes success ratios for the medication/treatment regimen in a determined decision subset of the patient identifier. The predictive data analysis computing entity 106 may then perform prediction-based actions based at least in part on a medication/treatment regimen having a highest predictive output (i.e., a highest success ratio). Examples of prediction-based actions include automatic prescription filling operations and/or scheduling automatic consultation sessions to discuss the medication/treatment regimen having the highest predictive output. Other examples of prediction-based actions include automatically transmitting notifications to a computing device of the patient identifier to recommend the medication/treatment regimen having the highest predictive output.

In some embodiments, performing the prediction-based actions includes generating user interface data for a prediction output user interface that describes predictive outputs (e.g., recommendation scores) for a set of candidate medication/treatment regimens that are supplied by an end user and enables filling prescriptions for the noted candidate medication/treatment regimens. An operational example of such a prediction output user interface 1000 is depicted in FIG. 10. As depicted in FIG. 10, the prediction output user interface 1000 is generated in response to a query specifying a set of candidate medication/treatment regimens 1001, that may be modified by selecting the button 1002. The prediction output user interface 1000 displays the recommendation score for each candidate medication/treatment regimen, and enables generating requests for filling prescriptions for each candidate medication/treatment regimen by using the buttons 1003A-1003C.

Therefore, various embodiments of the present invention address technical challenges associated with performing predictive data analysis (e.g., machine learning) operations in feature spaces having a high number of categorical predictive features by introducing techniques for intelligently selecting decision subsets of categorical predictive features using iterative feature refinement operations. The noted techniques enable limiting traversals of a training set characterized by a high number of categorical predictive features to a maximal set of categorical predictive features that are associated with at least a threshold number of training entries. This in turn means that, instead of having to traverse all of the training entries to perform predictive data analysis operations, a proposed solution may simply select a subset of the training entries that satisfy the maximal set (and are thus selected in a manner that is configured to minimize the number of the selected training entries). As a result, predictive data analysis operations can be performed more efficiently by focusing on an intelligently-selected subset of the training data, not the entirety of the training data. In this way, various embodiments of the present invention make substantial improvements to the efficiency of predictive data analysis (e.g., machine learning) operations in feature spaces that have a high number of categorical predictive features.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a predictive output for a predictive input that is associated with a plurality of predictive feature values, the computer-implemented method comprising:
    identifying, by one or more processors, a plurality of predictiveness measures corresponding to the plurality of predictive feature values;
    determining, by the one or more processors, a decision subset of the plurality of predictive feature values based at least in part on the plurality of predictiveness measures, wherein: (i) the decision subset is initialized to comprise all of the plurality of predictive feature values, (ii) determining the decision subset comprises performing one or more feature refinement routine iterations until a target feature refinement routine iteration in which a feature coverage count of the decision subset satisfies a feature coverage count threshold, and (iii) performing a current feature refinement routine iteration comprises, in response to determining that the feature coverage count of the decision subset fails to satisfy the feature coverage count threshold and no defined stopping conditions have been satisfied: (a) modifying the decision subset to exclude at least one of the plurality of predictive feature values in the decision subset that has a lowest one of the plurality of predictiveness measures that are associated with the decision subset, and (b) performing a subsequent feature refinement routine iteration;
    determining, by the one or more processors, the predictive output based at least in part on one or more detected predictive trends for the decision subset; and
    performing, by the one or more processors, one or more prediction-based actions based at least in part on the predictive output.

2. The computer-implemented method of claim 1, wherein identifying a particular predictiveness measure of the plurality of predictiveness measures corresponding to a particular predictive feature value of the plurality of predictiveness measures comprises:
    for each prior predictive machine learning model of a plurality of prior predictive machine learning models, determining a per-model feature weight value, of a plurality of per-model feature weight values, for the particular predictive feature value with respect to a per-model output of the prior predictive machine learning model; and
    determining the particular predictiveness measure based at least in part on the plurality of per-model feature weight values.

3. The computer-implemented method of claim 2, wherein determining a particular per-model feature weight value of the plurality of per-model feature weight values for a particular prior predictive machine learning model of the plurality of prior predictive machine learning models comprises:
    for each prior predictive machine learning model of the plurality of prior predictive machine learning models, determining an initial per-model feature weight value, of a plurality of initial per-model feature weight values, for the particular predictive feature value with respect to the per-model output of the prior predictive machine learning model; and
    determining the particular per-model feature weight value based at least in part on normalizing the initial per-model feature weight value for the particular prior predictive machine learning model in relation to the plurality of initial per-model feature weight values.

4. The computer-implemented method of claim 2, wherein the plurality of prior predictive machine learning models comprises an assignment machine learning model and an outcome machine learning model.

5. The computer-implemented method of claim 1, further comprising identifying the plurality of predictive feature values, wherein identifying the plurality of predictive feature values comprises:
    identifying a plurality of initial predictive feature values;
    generating a plurality of sampled subsets of a plurality of ground-truth predictive outputs;
    for each initial predictive feature value of the plurality of initial predictive feature values:
        determining a plurality of per-sample weight measures for the initial predictive feature value, where each per-sample weight measure of the plurality of per-sample weight measures is associated with a sampled subset of the plurality of sampled subsets, and
        determining whether to include the initial predictive feature value in a refined subset of the plurality of initial predictive feature values based at least in part on the plurality of per-sample weight measures; and
    generating the plurality of predictive feature values based at least in part on the refined subset.

6. The computer-implemented method of claim 5, wherein generating the plurality of predictive feature values based at least in part on the refined subset comprises:
    for each initial predictive feature value in the refined subset, determining a least absolute shrinkage and selection operator feature selection operation on the plurality of initial predictive feature values in relation to the plurality of ground-truth predictive outputs to generate a selected subset of the plurality of initial predictive feature values; and
    generating the plurality of predictive feature values based at least in part on the selected subset.

7. The computer-implemented method of claim 6, further comprising determining whether to include a particular initial predictive feature value from the plurality of initial predictive feature values in the selected subset based at least in part on:
    determining a contribution direction consistency indicator describing whether all of the plurality of per-sample weight measures for the particular initial predictive feature value have a common contribution direction; and
    determining whether to include the particular initial predictive feature value in the selected based at least in part on the contribution direction consistency indicator.

8. The computer-implemented method of claim 6, further comprising determining whether to include a particular initial predictive feature value from the plurality of initial predictive feature values in the selected subset based at least in part on:
    determining a sampling contribution relevance count describing a count of the plurality of per-sample weight measures for the particular initial predictive feature value that satisfy a per-sample weight measure threshold; and determining whether to include the particular initial predictive feature value in the selected subset based at least in part on the sampling contribution relevance count.

9. The computer-implemented method of claim 1, further comprising the feature coverage count of the decision subset for the current feature refinement routine iteration comprises:

determining the feature coverage count based at least in part on a count of a subset of a plurality of ground-truth predictive inputs that satisfy the decision subset.

10. The computer-implemented method of claim 1, wherein:

the predictive output is selected from a plurality of candidate predictive outputs for the predictive input; and the one or more prediction-based actions are performed from a highest predictive output of the plurality of candidate predictive outputs, wherein the highest predictive output is indicative of having a highest probability of being effective.

11. A system for generating a predictive output for a predictive input that is associated with a plurality of predictive feature values, the system comprising one or more processors and memory including program code, the memory and the program code configured to, with the one or more processors, cause the system to at least:

identify a plurality of predictiveness measures corresponding to the plurality of predictive feature values;

determine a decision subset of the plurality of predictive feature values based at least in part on the plurality of predictiveness measures, wherein: (i) the decision subset is initialized to comprise all of the plurality of predictive feature values, (ii) determining the decision subset comprises performing one or more feature refinement routine iterations until a target feature refinement routine iteration in which a feature coverage count of the decision subset satisfies a feature coverage count threshold, and (iii) performing a current feature refinement routine iteration comprises, in response to determining that the feature coverage count of the decision subset fails to satisfy the feature coverage count threshold and no defined stopping conditions have been satisfied: (a) modifying the decision subset to exclude at least one of the plurality of predictive feature values in the decision subset that has a lowest one of the plurality of predictiveness measures that are associated with the decision subset, and (b) performing a subsequent feature refinement routine iteration;

determine the predictive output based at least in part on one or more detected predictive trends for the decision subset; and perform one or more prediction-based actions based at least in part on the predictive output.

12. The system of claim 11, wherein, to identify a particular predictiveness measure of the plurality of predictiveness measures corresponding to a particular predictive feature value of the plurality of predictiveness measures, the memory and the program code are further configured to, with the one or more processors, cause the system to at least:

for each prior predictive machine learning model of a plurality of prior predictive machine learning models, determine a per-model feature weight value, of a plurality of per-model feature weight values, for the particular predictive feature value with respect to a per-model output of the prior predictive machine learning model; and determine the particular predictiveness measure based at least in part on the plurality of per-model feature weight values.

13. The system of claim 12, wherein, to determine a particular per-model feature weight value of the plurality of per-model feature weight values for a particular prior predictive machine learning model of the plurality of prior predictive machine learning models, the memory and the program code are further configured to, with the one or more processors, cause the system to at least:

for each prior predictive machine learning model of the plurality of prior predictive machine learning models, determine an initial per-model feature weight value, of a plurality of initial per-model feature weight values, for the particular predictive feature value with respect to the per-model output of the prior predictive machine learning model; and determine the particular per-model feature weight value based at least in part on normalizing the initial per-model feature weight value for the particular prior predictive machine learning model in relation to the plurality of initial per-model feature weight values.

14. The system of claim 12, wherein the plurality of prior predictive machine learning models comprises an assignment machine learning model and an outcome machine learning model.

15. The system of claim 11, wherein the memory and the program code are further configured to, with the one or more processors, cause the system to at least identify the plurality of predictive feature values; and wherein, to identify the plurality of predictive feature values, the memory and the program code are further configured to, with the one or more processors, cause the system to at least:

identify a plurality of initial predictive feature values;

generate a plurality of sampled subsets of a plurality of ground-truth predictive outputs;

for each initial predictive feature value of the plurality of initial predictive feature values:

determine a plurality of per-sample weight measures for the initial predictive feature value, where each per-sample weight measure of the plurality of per-sample weight measures is associated with a sampled subset of the plurality of samples subsets, and determine whether to include the initial predictive feature value in a refined subset of the plurality of initial predictive feature values based at least in part on the plurality of per-sample weight measures; and generate the plurality of predictive feature values based at least in part on the refined subset.

16. The system of claim 15, wherein, to generate the plurality of predictive feature values based at least in part on the refined subset, the memory and the program code are further configured to, with the one or more processors, cause the system to at least:

for each initial predictive feature value in the refined subset, determine a least absolute shrinkage and selection operator feature selection operation on the plurality of initial predictive feature values in relation to the plurality of ground-truth predictive outputs to generate a selected subset of the plurality of initial predictive feature values; and generate the plurality of predictive feature values based at least in part on the selected subset.

17. The system of claim 16, wherein the memory and the program code are further configured to, with the one or more processors, cause the system to at least determine whether to include a particular initial predictive feature value from the plurality of initial predictive feature values in the selected subset; and wherein, to determine whether to include the particular initial predictive feature value in the selected subset, the memory and the program code are further configured to, with the one or more processors, cause the system to at least:
- determine a contribution direction consistency indicator describing whether all of the plurality of per-sample weight measures for the particular initial predictive feature value have a common contribution direction; and
- determine whether to include the particular initial predictive feature value in the selected based at least in part on the contribution direction consistency indicator.

18. The system of claim 16, wherein the memory and the program code are further configured to, with the one or more processors, cause the system to at least determine whether to include a particular initial predictive feature value from the plurality of initial predictive feature values in the selected subset; and wherein, to determine whether to include the particular initial predictive feature value in the selected subset, the memory and the program code are further configured to, with the one or more processors, cause the system to at least:
- determine a sampling contribution relevance count describing a count of the plurality of per-sample weight measures for the particular initial predictive feature value that satisfy a per-sample weight measure threshold; and
- determine whether to include the particular initial predictive feature value in the selected subset based at least in part on the sampling contribution relevance count.

19. The system of claim 11, wherein the memory and the program code are further configured to, with the one or more processors, cause the system to at least determine the feature coverage count of the decision subset for the current feature refinement routine iteration; and wherein, to determine the feature coverage count of the decision subset for the current feature refinement routine iteration, the memory and the program code are further configured to, with the one or more processors, cause the system to at least:
- determine the feature coverage count based at least in part on a count of a subset of a plurality of ground-truth predictive inputs that satisfy the decision subset.

20. A computer program product for generating a predictive output for a predictive input that is associated with a plurality of predictive feature values, the computer program product comprising at least one non-transitory computer-readable storage medium having computer-readable program code portions stored therein that, when executed by one or more processors, cause the one or more processors to:
- identify a plurality of predictiveness measures corresponding to the plurality of predictive feature values;
- determine a decision subset of the plurality of predictive feature values based at least in part on the plurality of predictiveness measures, wherein: (i) the decision subset is initialized to comprise all of the plurality of predictive feature values, (ii) determining the decision subset comprises performing one or more feature refinement routine iterations until a target feature refinement routine iteration in which a feature coverage count of the decision subset satisfies a feature coverage count threshold, and (iii) performing a current feature refinement routine iteration comprises, in response to determining that the feature coverage count of the decision subset fails to satisfy the feature coverage count threshold and no defined stopping conditions have been satisfied: (a) modifying the decision subset to exclude at least one of the plurality of predictive feature values in the decision subset that has a lowest one of the plurality of predictiveness measures that are associated with the decision subset, and (b) performing a subsequent feature refinement routine iteration;
- determine the predictive output based at least in part on one or more detected predictive trends for the decision subset; and
- perform one or more prediction-based actions based at least in part on the predictive output.

* * * * *

UNITED STATES PATENT AND TRADEMARK OFFICE
CERTIFICATE OF CORRECTION

| | | |
|---|---|---|
| PATENT NO. | : 12,353,972 B2 | Page 1 of 1 |
| APPLICATION NO. | : 17/449995 | |
| DATED | : July 8, 2025 | |
| INVENTOR(S) | : Christopher A. Hane et al. | |

It is certified that error appears in the above-identified patent and that said Letters Patent is hereby corrected as shown below:

In the Claims

In Column 35, Line 9, Claim 9, delete "comprising the" and insert -- comprising determining the --, therefor.

In Column 36, Line 47, Claim 15, delete "samples subsets" and insert -- sampled subsets --, therefor.

Signed and Sealed this
Seventh Day of October, 2025

John A. Squires
*Director of the United States Patent and Trademark Office*